(12) United States Patent
Yu et al.

(10) Patent No.: US 12,463,662 B2
(45) Date of Patent: Nov. 4, 2025

(54) DATA COMPRESSION METHOD AND APPARATUS

(71) Applicant: HUAWEI TECHNOLOGIES CO., LTD., Guangdong (CN)

(72) Inventors: Chao Yu, Shenzhen (CN); Yi Chen, Shenzhen (CN); Guifu Li, Shenzhen (CN); Ge Qiu, Shanghai (CN); Zhipeng Li, Shenzhen (CN); Daiyue Zhang, Shanghai (CN); Jing Qian, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 18/567,644

(22) PCT Filed: Apr. 7, 2022

(86) PCT No.: PCT/CN2022/085621
§ 371 (c)(1),
(2) Date: Dec. 6, 2023

(87) PCT Pub. No.: WO2022/262381
PCT Pub. Date: Dec. 22, 2022

(65) Prior Publication Data
US 2024/0283463 A1 Aug. 22, 2024

(30) Foreign Application Priority Data
Jun. 16, 2021 (CN) .......................... 202110667882.7

(51) Int. Cl.
*H03M 7/30* (2006.01)
*G06F 3/06* (2006.01)

(52) U.S. Cl.
CPC ........ *H03M 7/6047* (2013.01); *G06F 3/0608* (2013.01); *G06F 3/064* (2013.01); *G06F 3/0641* (2013.01); *G06F 3/0683* (2013.01)

(58) Field of Classification Search
CPC .... H03M 7/6047; G06F 3/0608; G06F 3/064; G06F 3/0641; G06F 3/0683
See application file for complete search history.

(56) References Cited

U.S. PATENT DOCUMENTS

| 5,305,295 A | 4/1994 | Chu |
| 2020/0366314 A1 | 11/2020 | Romanovskii et al. |
| 2021/0173811 A1* | 6/2021 | Agrawal ............. G06F 11/1469 |

FOREIGN PATENT DOCUMENTS

| CN | 103516369 A | 1/2014 |
| CN | 107947799 A | 4/2018 |

(Continued)

OTHER PUBLICATIONS

International Search Report and Written Opinion in International Appln. No. PCT/CN2022/085621, mailed on Jun. 15, 2022, 17 pages (with English translation).

(Continued)

*Primary Examiner* — Joseph J Lauture
(74) *Attorney, Agent, or Firm* — Fish & Richardson P.C.

(57) ABSTRACT

This application discloses a data compression method and apparatus. The method includes: obtaining m data blocks in a data area of a readable and writable file system; compressing the m data blocks by using a preset compression algorithm, to sequentially obtain n compressed data blocks, where first capacities of the compressed data blocks are the same, and the first capacity represents a quantity of bytes of compressed data that can be included in the compressed data block; and establishing a first index of each of j data blocks corresponding to an $i^{th}$ compressed data block in the n compressed data blocks, and recording a mapping relation- (Continued)

ship between first indexes and the j data blocks. The first index is used to identify a storage location, in a storage medium, of each data block included in the j data blocks, and attribute information included in each of the j data blocks.

20 Claims, 14 Drawing Sheets

(56) References Cited

FOREIGN PATENT DOCUMENTS

| CN | 110557124 A | 12/2019 |
|---|---|---|
| JP | 2013127802 A | 6/2013 |
| JP | 2018530053 A | 10/2018 |

OTHER PUBLICATIONS

Extended European Search Report in European Appln. No. 22823871.3, mailed on Oct. 8, 2024, 11 pages.

Office Action in Japanese Appln. No. 2023-577669, mailed on Mar. 4, 2025, 10 pages (with English translation).

* cited by examiner

DATA COMPRESSION METHOD AND APPARATUS

CROSS-REFERENCE TO RELATED APPLICATIONS

This application is a national stage of International Application No. PCT/CN2022/085621, filed on Apr. 7, 2022, which claims priority to Chinese Patent Application No. 202110667882.7, filed on Jun. 16, 2021. Both of the aforementioned applications are hereby incorporated by reference in their entireties.

TECHNICAL FIELD

This application relates to the field of data compression technologies, and in particular, to a data compression method and apparatus.

BACKGROUND

To improve overall input output (IO) read/write performance of a storage system, a file in a memory needs to be compressed. Currently, there are Linux read/write file systems, such as F2FS, journaling Flash file system version 2 (JFFS2), and B-tree file system (BTRFS), and Windows read/write file systems, such as NTFS. Because a metadata area accounts for a small proportion of the entire file system, a data area usually occupies a large storage capacity of a device. Therefore, compressing data in the data area can reduce a size of the input output IO and improve the overall IO read/write performance.

In an existing data compression method, original file data (or referred to as source data) that needs to be compressed is generally compressed based on a minimum compressible unit of a fixed size, and compressed file data (or referred to as compressed data) may include header data and compressed data. The header data is used to represent attribute information of file data, and the compressed data is used to represent content of the file data. Then, the compressed file data is saved in a storage medium. However, an existing compression solution for the read/write file system has a problem of random read amplification, and read efficiency is low.

SUMMARY

Embodiments of this application provide a data compression method and apparatus, to resolve a problem of random read amplification of a read/write file system, and improve read efficiency.

According to a first aspect, an embodiment of this application provides a data compression method. The method may be performed by an electronic device, or may be performed by a component (for example, a chip, a chip system, or a processor) located in the electronic device. The following provides description by using an example in which the method is performed by the electronic device. The method includes: An electronic device obtains m data blocks in a data area of a readable and writable file system, where m is a positive integer greater than or equal to 1. The electronic device compresses the m data blocks by using a preset compression algorithm, to sequentially obtain n compressed data blocks, where first capacities of all compressed data blocks are the same, the first capacity represents a quantity of bytes of compressed data that can be included in the compressed data block, and n is a positive integer greater than or equal to 1. The electronic device establishes a first index of each of j data blocks corresponding to an $i^{th}$ compressed data block in the n compressed data blocks, and records a mapping relationship between first indexes and the j data blocks. i is a positive integer greater than or equal to 1 and less than or equal to n, and j is a positive integer greater than or equal to 1 and less than or equal to m. The first index is used to identify a storage location, in a storage medium, of each data block included in the j data blocks, and attribute information included in each of the j data blocks.

Therefore, according to the data compression method provided in embodiments of this application, when a data block is read, read efficiency can be effectively improved, and it can be ensured that data is read in a random read scenario with a small read amplification coefficient. In addition, an attribute included in the index of the data block may be modified, so that a compressed file on a storage device may be modified. It can be learned that, in embodiments of this application, a problem of random read amplification of a compression solution in an existing read/write file system is resolved, and a problem that an existing file system with a fixed output compression manner cannot support data and metadata update is resolved.

In a specific and possible implementation, the compressing the m data blocks by using a preset compression algorithm, to obtain n compressed data blocks sequentially is specifically: sequentially allocating all data blocks in the m data blocks to a first set in a preset order. When a data capacity of the j data blocks in the first set is equal to a rated capacity of the first set, a compression operation is performed on the j data blocks based on a specified compression threshold, to obtain the $i^{th}$ compressed data block.

In a specific and possible implementation, the establishing a first index of each of j data blocks corresponding to an $i^{th}$ compressed data block in the n compressed data blocks is specifically: when a sum of a total data length of header data and compressed data of the $i^{th}$ compressed data block and the specified compression threshold is less than or equal to a total data length of the j data blocks, establishing the first index of each of the j data blocks.

In a specific and possible implementation, the attribute information includes at least one of the following: a first attribute, used to represent whether a storage location of a compressed data block into which a data block is compressed is pre-allocated; a second attribute, used to represent whether a data page of a data block is valid; a third attribute, used to represent whether a data page of a data block is a first compressed page of a compressed data block of the data block; a fourth attribute, used to represent whether a data page of a data block is included in compressed data pages of two compressed blocks; a fifth attribute, used to represent whether a data page of a data block is a compressed page of a compressed data block obtained by compressing the data block; a sixth attribute, used to represent an index address of a compressed data block in which a data page of a data block is located; and a seventh attribute, used to represent that when a data page of a data block belongs to a first compressed page of a compressed data block of the data block, an attribute value of the seventh attribute is an offset of the data block in a set corresponding to the compressed data block; and when the data page of the data block does not belong to the first compressed page of the compressed data block of the data block, the attribute value of the seventh attribute is a distance between the data page of the data block and the first compressed page of the compressed data block.

In a specific and possible implementation, the attribute information includes the third attribute, and the establishing a first index of each of j data blocks corresponding to an $i^{th}$ compressed data block in the n compressed data blocks is specifically: when a data page of each of the j data blocks is a first compressed page of the $i^{th}$ compressed data block, assigning 1 to an attribute value of the third attribute; or when a data page of each of the j data blocks is not a first compressed page of the $i^{th}$ compressed data block, assigning 0 to an attribute value of the third attribute.

In a specific and possible implementation, the attribute information includes the seventh attribute, and the method further includes: when the attribute value of the third attribute is 1, updating the attribute value of the seventh attribute to the offset of the data block in the set corresponding to the compressed data block; or when the attribute value of the third attribute is 0, updating the attribute value of the seventh attribute to the distance between the data page of the data block and the first compressed page of the compressed data block.

In a specific and possible implementation, the attribute information includes the fourth attribute, and the establishing a first index of each of j data blocks corresponding to an $i^{th}$ compressed data block in the n compressed data blocks is specifically: when a data page of each of the j data blocks is included in compressed data pages of two compressed blocks, assigning 1 to an attribute value of the fourth attribute; or when a data page of each of the j data blocks is not included in compressed data pages of two compressed blocks, assigning 0 to an attribute value of the fourth attribute.

In a specific and possible implementation, the attribute information includes the second attribute, and the establishing a first index of each of j data blocks corresponding to an $i^{th}$ compressed data block in the n compressed data blocks is specifically: when a data page of each of the j data blocks is valid, assigning 1 to an attribute value of the second attribute; or when a data page of each of the j data blocks is invalid, assigning 0 to an attribute value of the second attribute.

In some possible implementations, before the compressing the m data blocks by using a preset compression algorithm, to sequentially obtain n compressed data blocks, the method further includes: obtaining a second set of to-be-overwritten data, where the second set includes p compressed data blocks, and p is a positive integer greater than or equal to 1; obtaining a compressed page of a first target compressed data block in the p compressed data blocks and q data blocks corresponding to the compressed page of the first target compressed data block, where q is a positive integer greater than or equal to 1; determining, in the q data blocks, a location offset of a first target data block in the q data blocks; and determining that a data page of the first target data block is a data page of the to-be-overwritten data.

In a specific and possible implementation, the first index is used to identify a storage location of the $i^{th}$ compressed data block in the storage medium, and attribute information included in each of the j data blocks.

In some possible implementations, the method further includes: reading a first index of a first data block to obtain an index address of a first compressed data block corresponding to the first data block, where the first index includes attribute information of the first data block; reading an index of the first compressed data block corresponding to the first data block; decompressing the first compressed data block based on the index of the first compressed data block, to obtain a plurality of data blocks corresponding to the first compressed data block, where the plurality of data blocks include the first data block; determining an offset of the first data block in a plurality of decompressed data blocks; and obtaining data of the first data block based on the offset of the first data block in the plurality of decompressed data blocks.

According to a second aspect, an embodiment of this application provides a data compression apparatus. The apparatus includes: a first obtaining unit, configured to obtain m data blocks in a data area of a readable and writable file system, where m is a positive integer greater than or equal to 1; a compression unit, configured to compress the m data blocks by using a preset compression algorithm, to sequentially obtain n compressed data blocks, where first capacities of all compressed data blocks are the same, the first capacity represents a quantity of bytes of compressed data that can be included in the compressed data block, and n is a positive integer greater than or equal to 1; and an updating unit, configured to: establish a first index of each of j data blocks corresponding to an $i^{th}$ compressed data block in the n compressed data blocks, and record a mapping relationship between first indexes and the j data blocks. i is a positive integer greater than or equal to 1 and less than or equal to n, and j is a positive integer greater than or equal to 1 and less than or equal to m. The first index is used to identify a storage location, in a storage medium, of each data block included in the j data blocks, and attribute information included in each of the j data blocks.

Therefore, according to the data compression method provided in embodiments of this application, when a data block is read, read efficiency can be effectively improved, and it can be ensured that data is read in a random read scenario with a small read amplification coefficient. In addition, an attribute included in the index of the data block may be modified, so that a compressed file on a storage device may be modified. It can be learned that, in embodiments of this application, a problem of random read amplification of a compression solution in an existing read/write file system is resolved, and a problem that an existing file system with a fixed output compression manner cannot support data and metadata update is resolved.

In a specific and possible implementation, the compression unit is configured to sequentially allocate all data blocks in the m data blocks to a first set in a preset order. When a data capacity of the j data blocks in the first set is equal to a rated capacity of the first set, a compression operation is performed on the j data blocks based on a specified compression threshold, to obtain the $i^{th}$ compressed data block.

In a specific and possible implementation, the updating unit is configured to: when a sum of a total data length of header data and compressed data of the $i^{th}$ compressed data block and the specified compression threshold is less than or equal to a total data length of the j data blocks, establish the first index of each of the j data blocks.

In a specific and possible implementation, the attribute information includes at least one of the following: a first attribute, used to represent whether a storage location of a compressed data block into which a data block is compressed is pre-allocated; a second attribute, used to represent whether a data page of a data block is valid; a third attribute, used to represent whether a data page of a data block is a first compressed page of a compressed data block of the data block; a fourth attribute, used to represent whether a data page of a data block is included in compressed data pages of two compressed blocks; a fifth attribute, used to represent whether a data page of a data block is a compressed page of a compressed data block obtained by compressing the data block; a sixth attribute, used to represent an index address of a compressed data block in which a data page of a data block is located; and a seventh attribute, used to represent that when a data page of a data block belongs to a first compressed page of a compressed data block of the data block, an attribute value of the seventh attribute is an offset of the data block in a set corresponding to the compressed data block. When the data page of the data block does not belong to the first compressed page of the compressed data block of the data block, the attribute value of the seventh attribute is a distance between the data page of the data block and the first compressed page of the compressed data block.

In a specific and possible implementation, the attribute information includes the third attribute, and the updating unit is further configured to: when a data page of each of the j data blocks is a first compressed page of the $i^{th}$ compressed data block, assign 1 to an attribute value of the third attribute; or when a data page of each of the j data blocks is not a first compressed page of the $i^{th}$ compressed data block, assign 0 to an attribute value of the third attribute.

In a specific and possible implementation, the attribute information includes the seventh attribute, and the updating unit is further configured to: when the attribute value of the third attribute is 1, update the attribute value of the seventh attribute to the offset of the data block in the set corresponding to the compressed data block; or when the attribute value of the third attribute is 0 update the attribute value of the seventh attribute to the distance between the data page of the data block and the first compressed page of the compressed data block.

In a specific and possible implementation, the attribute information includes the fourth attribute, and the updating unit is further configured to: when a data page of each of the j data blocks is included in compressed data pages of two compressed blocks, assign 1 to an attribute value of the fourth attribute; or when a data page of each of the j data blocks is not included in compressed data pages of two compressed blocks, assign 0 to an attribute value of the fourth attribute.

In a specific and possible implementation, the attribute information includes the second attribute, and the updating unit is further configured to: when a data page of each of the j data blocks is valid, assign 1 to an attribute value of the second attribute; or when a data page of each of the j data blocks is invalid, assign 0 to an attribute value of the second attribute.

In some possible implementations, the apparatus further includes: a second obtaining unit, configured to obtain a second set of to-be-overwritten data, where the second set includes p compressed data blocks, and p is a positive integer greater than or equal to 1; a third obtaining unit, configured to obtain a compressed page of a first target compressed data block in the p compressed data blocks and q data blocks corresponding to the compressed page of the first target compressed data block, where q is a positive integer greater than or equal to 1; a first determining unit, configured to determine, in the q data blocks, a location offset of a first target data block in the q data blocks; and a second determining unit, configured to determine that a data page of the first target data block is a data page of the to-be-overwritten data.

In a specific and possible implementation, the first index is used to identify a storage location of the $i^{th}$ compressed data block in the storage medium, and attribute information included in each of the j data blocks.

In some possible implementations, the apparatus further includes: a first reading unit, configured to read a first index of a first data block to obtain an index address of a first compressed data block corresponding to the first data block, where the first index includes attribute information of the first data block; a second reading unit, configured to read an index of the first compressed data block corresponding to the first data block; a decompression unit, configured to decompress the first compressed data block based on the index of the first compressed data block, to obtain a plurality of data blocks corresponding to the first compressed data block, where the plurality of data blocks include the first data block; a third determining unit, configured to determine an offset of the first data block in a plurality of decompressed data blocks; and a third obtaining unit, configured to obtain data of the first data block based on the offset of the first data block in the plurality of decompressed data blocks.

According to a third aspect, an embodiment of this application provides a device, configured to perform the data compression method in the first aspect.

According to a fourth aspect, an embodiment of this application provides a computer-readable storage medium. The computer-readable storage medium includes computer instructions. When the computer instructions are run on an electronic device, the electronic device is enabled to perform the data compression method in the first aspect.

According to a fifth aspect, an embodiment of this application provides a computer program. When the program is invoked by a processor, the data compression method in the first aspect is performed.

According to a sixth aspect, an embodiment of this application provides a chip system, including one or more processors. When the one or more processors execute instructions, the one or more processors perform the data compression method in the first aspect.

It should be understood that, descriptions of technical features, technical solutions, beneficial effect, or similar words in this application do not imply that all features and advantages can be implemented in any individual embodiment. On the contrary, it may be understood that, the descriptions of the features or the beneficial effect mean that at least one embodiment includes a specific technical feature, technical solution, or beneficial effect. Therefore, the descriptions of the technical features, the technical solutions, or the beneficial effect in this specification may not necessarily be specific to a same embodiment. Further, the technical features, the technical solutions, and the beneficial effect described in embodiments may be combined in any proper manner. A person skilled in the art may understand that an embodiment may be implemented without one or more specific technical features or technical solutions, or beneficial effects in a specific embodiment. In other embodiments, additional technical features and beneficial effect may be identified in a specific embodiment that does not reflect all embodiments.

DESCRIPTION OF EMBODIMENTS

Terms "including", "having", and any other variant thereof mentioned in descriptions of this application are intended to cover a non-exclusive inclusion. For example, a process, a method, a system, a product, or a device that includes a series of steps or units is not limited to the listed steps or units, but optionally further includes another unlisted step or unit, or optionally further includes another step or unit that is inherent for the process, the method, the product, or the device.

It should be noted that, in embodiments of this application, the word "example" or "for example" is used to represent giving an example, an illustration, or a description. Any embodiment or design scheme described as "an example of" or "for example" in embodiments of this application should not be explained as being more preferred or having more advantages than another embodiment or design scheme. To be precise, the words such as "example" or "for example" are intended to present a relative concept in a specific manner.

In the descriptions of this application, unless otherwise specified, "a plurality of" means two or more than two. A term "and/or" in this specification describes only an association relationship between associated objects and indicates that there may be three relationships. For example, A and/or B may represent the following three cases: Only A exists, both A and B exist, and only B exists.

For ease of understanding, the following first describes related terms and concepts that may be used in embodiments of this application.

Figure 1A:
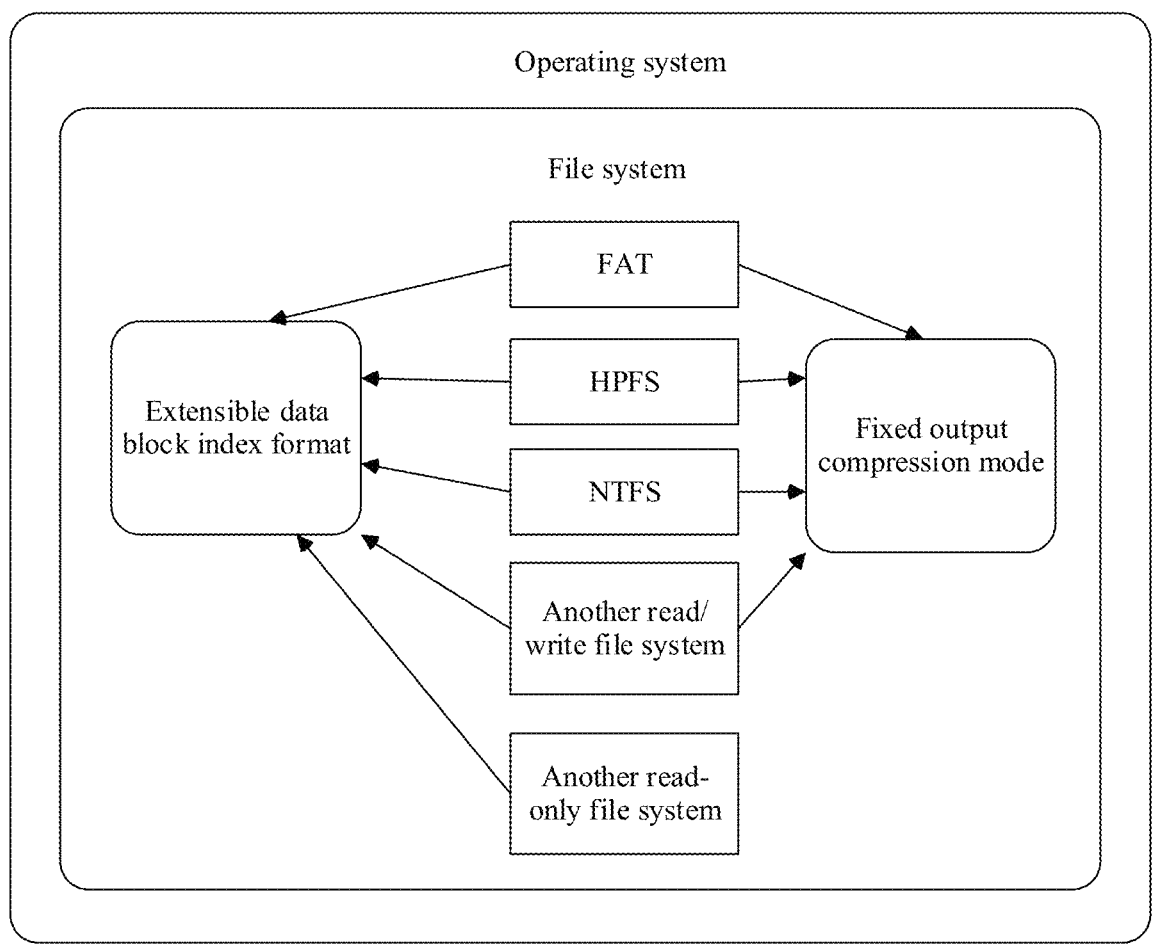
FIG. 1a is a composition block diagram of an operating system according to an embodiment of this application.

FIG. 1a is a composition block diagram of an operating system.

The operating system (OS for short) is a computer program that manages computer hardware and software resources, for example, unix, Windows, and Linux. The operating system needs to handle basic transactions, for example, managing and configuring a memory, determining a priority of a system resource supply and demand, controlling input and output devices, operating a network, and managing a file system. The operating system also provides an operation interface for a user to interact with a system.

An operating system kernel is a core part of most operating systems. The operating system kernel includes parts that are used to manage a storage device, a file, a peripheral, and a system resource in the operating system, manages a process, a memory, a device driver, a file, and a network system of the system, and determines performance and stability of the operating system. The operating system kernel is a system software that provides functions such as hardware abstraction layer, disk and file system control, and multi-tasking. The operating system kernel provides secure access to computer hardware for many applications, and can determine when an application performs operations on a part of the computer hardware and how long it takes. Because direct operations on computer hardware are very complex, the operating system kernel can provide a set of hardware abstraction methods to complete these operations.

The file system is a core module of the operating system kernel, that is, a main component. The file system is a method of organizing files on a storage device, managing and storing file information, mainly creating a file for a user, storing, reading, modifying, and dumping the file, controlling file access, and canceling the file when the user does not use the file anymore.

The file system provides abstract representation of the file in the kernel, maps a file to a physical storage device (such as a disk and a hard disk), and maps a physical address of the file on the storage device to a user-visible path and file name, facilitating quick reading, modification, and persistence of file data.

The file system includes a read/write file system and a read-only file system. The read/write file system is a file system that can write a file to a storage device or read a file from a storage device, for example, a file allocation table (FAT), a high performance file system (HPFS), a new technology file system (NTFS), a fourth extended file system (EXT4), and a flash friendly file system (F2FS). The read-only file system is a file system that can only read a file from a storage device but cannot write a file to a storage device, for example, an extendable read-only file system (EROFS).

To make this application clearer, an application scenario of this application is first described.

Figure 1B:
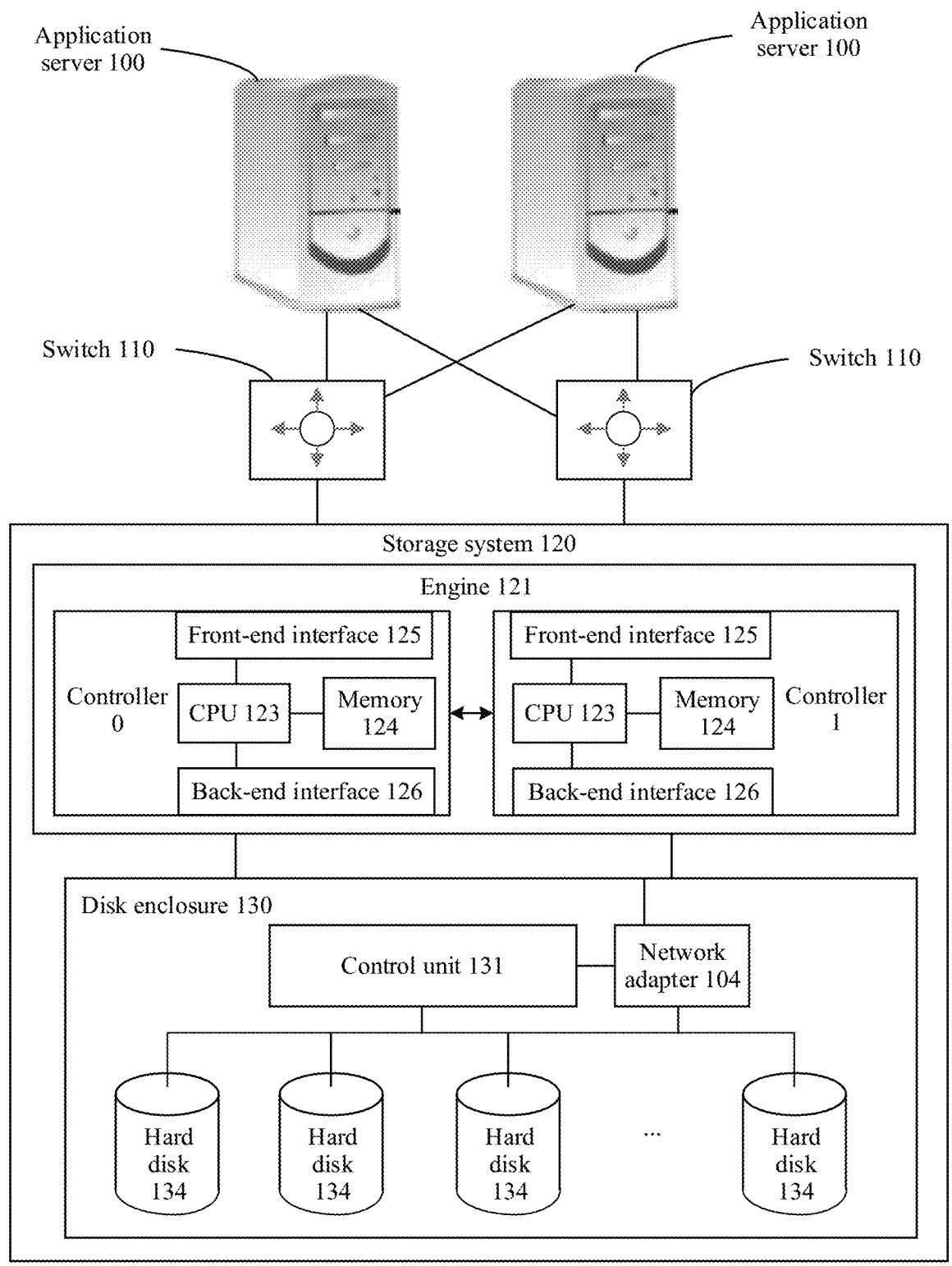
FIG. 1b is a schematic diagram of a structure of a storage system according to an embodiment of this application.

FIG. 1b is a schematic diagram of a structure of a storage system.

In the application scenario shown in FIG. 1b, a user accesses data by using applications. A computer running these applications is referred to as an "application server". The application server 100 may be a physical machine or a virtual machine. The physical application server includes but is not limited to a desktop computer, a server, a notebook computer, and a mobile device. The application server accesses the storage system by using a fiber channel switch 110 to access data. However, the switch 110 is only an optional device, and the application server 100 may also directly communicate with the storage system 120 by using a network. Alternatively, the fiber channel switch 110 may be replaced with an Ethernet switch, an InfiniBand switch, an RoCE (RDMA over Converged Ethernet) switch, or the like.

The storage system 120 shown in FIG. 1b is a centralized storage system. The centralized storage system is a central node including one or more main devices. Data is stored on the central node, and all data processing services of the entire system are deployed on the central node. In other words, in the centralized storage system, a terminal or a client is only responsible for data input and output, and all data storage and control processing are completed by the central node. The centralized storage system features a unified portal, and all data from an external device passes through this portal. The portal is an engine 121 of the centralized storage system. The engine 121 is a core component of the centralized storage system, and many advanced functions of the storage system are implemented in the engine 121.

As shown in FIG. 1b, the engine 121 has one or more controllers. An example in which the engine includes two controllers is used for description in FIG. 1b. There is a mirror channel between a controller 0 and a controller 1. Therefore, after the controller 0 writes a piece of data into a memory 124 of the controller 0 the controller 0 may send a copy of the data to the controller 1 through the mirror channel, and the controller 1 stores the copy in the local memory 124 of the controller 1. Therefore, the controller 0 and the controller 1 back up each other. When the controller 0 is faulty, the controller 1 may take over a service of the controller 0 When the controller 1 is faulty, the controller 0 may take over a service of the controller 1, thereby avoiding unavailability of the entire storage system 120 caused by a hardware fault. When 4 controllers are deployed in the engine 121, a mirror channel exists between any two controllers, and therefore any two controllers back up each other.

The engine 121 further includes a front-end interface 125 and a back-end interface 126, where the front-end interface 125 is configured to communicate with the application server 100, to provide a storage service for the application server 100. The back-end interface 126 is configured to communicate with a hard disk 134, to expand a capacity of the storage system. The engine 121 may connect to more hard disks 134 through the back-end interface 126, to form a large storage resource pool.

Based on a type of a communications protocol between the engine 121 and a disk enclosure 130, the disk enclosure 130 may be a SAS disk enclosure, an NVMe disk enclosure, an IP disk enclosure, or another type of disk enclosure. The SAS disk enclosure uses the SAS 3.0 protocol, and each enclosure supports 25 SAS hard disks. The engine 121 connects to the disk enclosure 130 through an onboard SAS interface or an SAS interface module. The NVMe disk enclosure is more like a complete computer system. An NVMe hard disk is inserted into the NVMe disk enclosure. In addition, the NVMe disk enclosure connects to the engine 121 through an RDMA port.

In terms of hardware, as shown in FIG. 1b, the controller 0 includes at least a processor 123 and a memory 124. The processor 123 is a central processing unit (central processing unit, CPU), configured to process a data access request from outside a storage system (the server or another storage system), and also configured to process a request generated inside the storage device. For example, when receiving, by using the front-end interface 125, data write requests sent by the application server 100, the processor 123 temporarily stores, in the memory 124, data in the data write requests. When a total amount of data in the memory 124 reaches a specific threshold, the processor 123 sends, by using a back-end interface, data stored in the memory 124 to the hard disk 134 for persistent storage.

The memory 124 is an internal memory that directly exchanges data with the processor. The data can be read and written in the memory at a high speed at any time, and the memory serves as a temporary data memory of an operating system or another running program. The memory includes at least two types of memories, for example, the memory may be a random access memory. For example, the random access memory is a dynamic random access memory (DRAM), or a storage class memory (SCM). The DRAM is a semiconductor memory, and is a volatile memory device like most random access memories (RAM). The SCM uses a composite storage technology that combines both a conventional storage apparatus feature and a memory feature. The storage class memory can provide a higher read/write speed than the hard disk, but is slower than the DRAM in terms of an access speed and cheaper than the DRAM in terms of costs. However, the DRAM and the SCM are merely examples for description in the embodiments. The memory may further include another random access memory, for example, a static random access memory (SRAM). In addition, the memory 124 may also be a dual in-line memory module (DIMM for short), that is, a module formed by a dynamic random access memory (DRAM), or may be a solid state disk (SSD). In actual application, a plurality of memories 124 and different types of memories 124 may be configured in the controller 0. A quantity and types of the memories 113 are not limited in this embodiment. In addition, the memory 124 may be configured to have a power failure protection function. The power failure protection function means that data stored in the memory 124 is not lost even when a system is powered on again after a power failure. A memory with a power failure protection function is referred to as a non-volatile memory.

Figure 2:
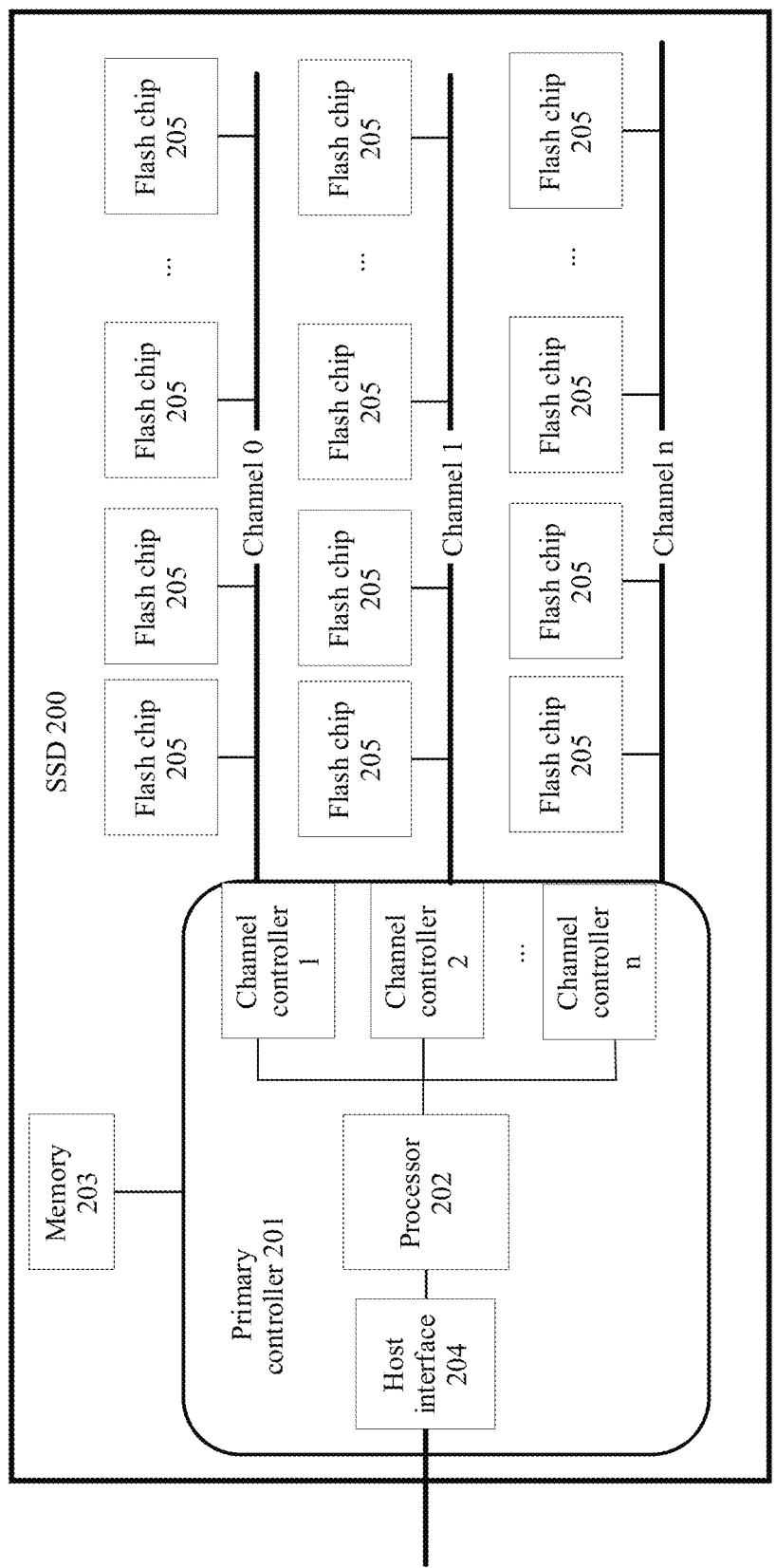
FIG. 2 is a schematic diagram of a structure of a solid state disk of a storage system in FIG. 1b.

For example, both the memory 124 and the hard disk 134 may be a solid-state drive (English: Solid-state drive or Solid-state disk. SSD for short), and are storage devices that mainly use a flash (NAND Flash) as a persistent memory. As shown in FIG. 2, the SSD 200 includes an NAND flash and a primary controller (PC for short) 201. The NAND flash includes a plurality of flash chips 205, configured to store data. The PC 201 is a brain center of the SSD, and is responsible for some complex tasks, such as managing data storage, and maintaining performance and a service life of the SSD. The PC 201 is an embedded microchip, and includes a processor 202 with a function like a command center, to send all operation requests of the SSD. For example, the processor 202 may perform functions such as reading/writing data, garbage collection, and wear leveling by using firmware in the buffer.

The SSD PC 201 further includes a host interface 204 and several channel controllers. The host interface 204 is configured to communicate with a host. The host herein may refer to any device such as a server, a personal computer, or an array controller. By using several channel controllers, the PC 201 may operate a plurality of flash chips 205 in parallel, to improve a bandwidth of a bottom layer. For example, it is assumed that there are 8 channels between the PC 201 and the FLASH chip, and the PC 201 reads and writes data to the 8 flash chips 205 in parallel through the 8 channels.

Figure 3:
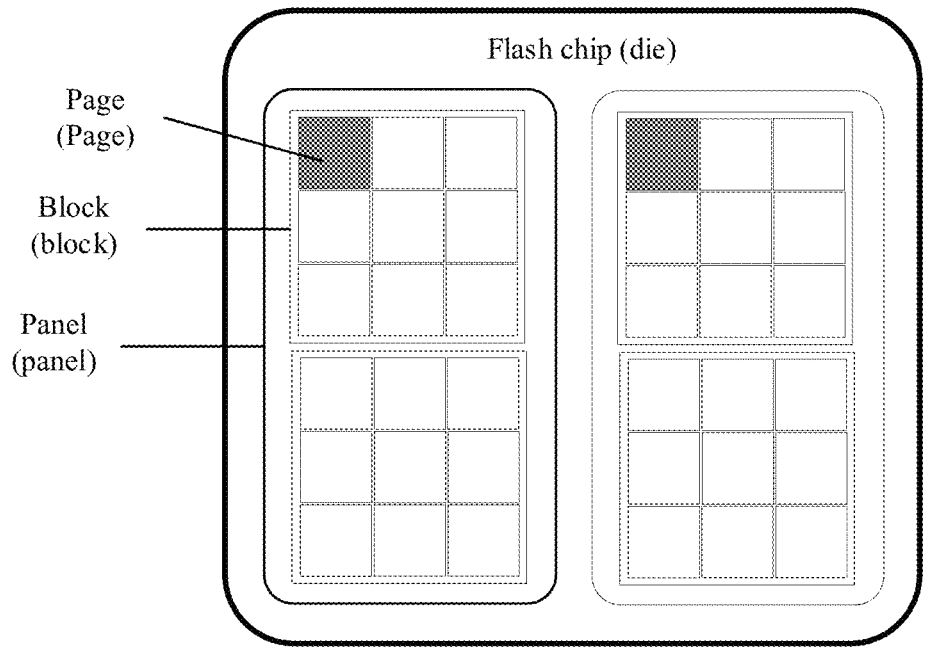
FIG. 3 is a schematic diagram of a structure of a flash chip of a solid state disk in FIG. 2.

As shown in FIG. 3, a die is a package of one or more flash chips. One die may include a plurality of panels (panel), and a multi-plane NAND is a design that can effectively improve performance. As shown in FIG. 3, one die is divided into 2 planes, and block numbers in the 2 planes are single- and dual-crossed. Therefore, during an operation, a single- and dual-cross operation may be performed to improve performance. One panel includes a plurality of blocks (block). One block includes several pages (page). A 16 GB flash chip is used as an example. Each 4314*8=34512 cells logically form a page. Each page can store 4-KB content and 218-B ECC parity data. A page is also a minimum unit of an IO operation. Every 128 pages form a block, and every 2048 blocks form a panel. An entire flash chip includes two panels. One panel stores blocks with odd numbers, and the other panel stores blocks with even numbers. The two planes can be operated concurrently. This is merely an example. A size of a page, a capacity of a block, and a capacity of a flash chip may have different specifications. This is not limited in this embodiment.

The host writes data into a block. When a block is full, the SSD PC 201 may select a next block to continue writing. A page is a minimum unit of data to be written. In other words, the PC 201 writes data into a block by using a page as a granularity. Block is a minimum unit for data erasure. The PC can erase only the entire block at a time.

Figure 4:
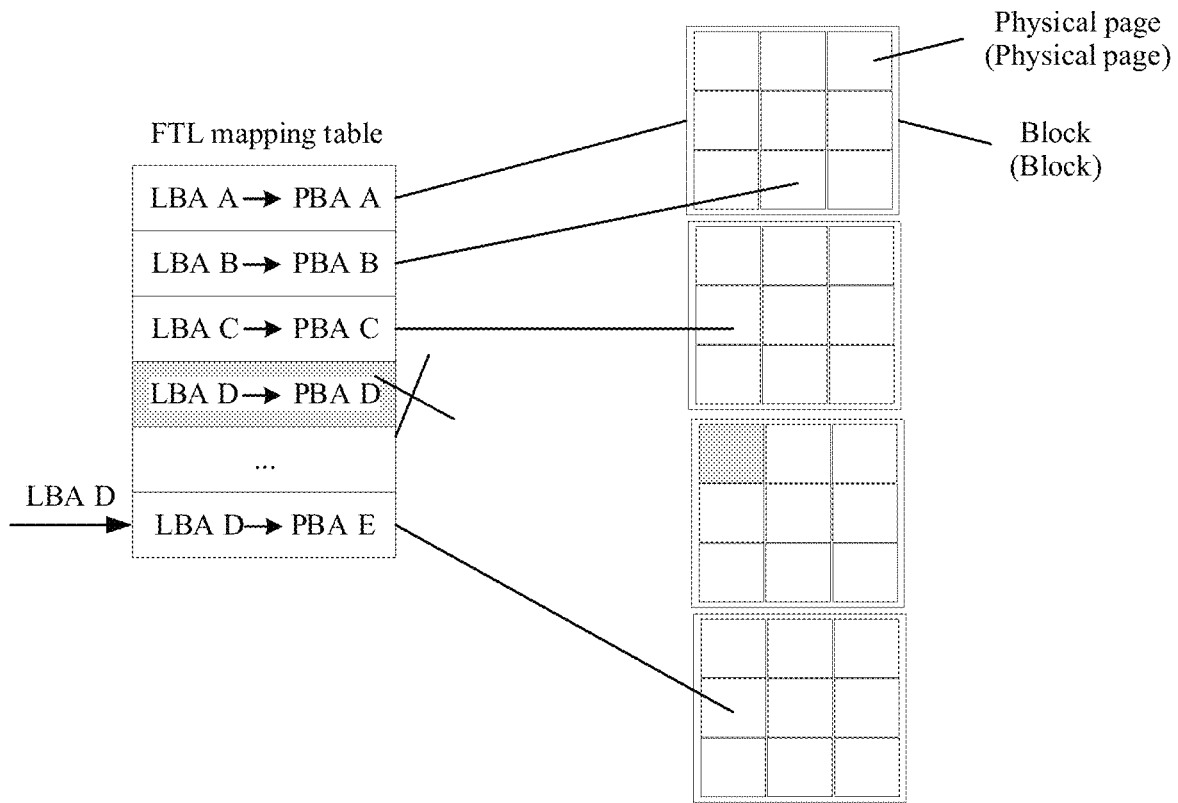
FIG. 4 is a schematic diagram of a flash translation layer corresponding to a flash chip in FIG. 3.

The host accesses the SSD by using a logical block address (LBA). Each LBA represents a sector (512 B is used as an example). In the SSD, the PC accesses the SSD in pages (4 KB is used as an example). Therefore, each time an application server writes a piece of data, the SSD PC searches for a page to write the data. An address of the page is referred to as a physical block address (PBA). A mapping from the LBA to the PBA is recorded inside the SSD. With such a mapping, when the host needs to read data of an LBA next time, the SSD knows a location from which the data is read in the flash chip. FIG. 4 is a schematic diagram of a flash translation layer (FTL). The FTL is located in firmware of the processor 202. As shown in FIG. 4, each time the host writes a piece of new data, a new mapping relationship is generated, and the mapping relationship is added to (first write) or changes (overwrite) the FTL. When reading a piece of data, the SSD first searches for a PBA corresponding to an LBA of the data in the FTL, and then reads corresponding data based on the PBA.

The flash chip cannot support overwriting. This means that when the host modifies data on an LBA, the data cannot be directly modified on a PBA corresponding to the LBA. The data should be written to a new PBA and a mapping should be added to the FTL. For example, there was a mapping relationship between LBA D and PBA D in the FTL. When the host sends an IO request to request to modify data of the LBA D, the SSD searches for a new location (PBA E) to write the data, and adds a mapping relationship between LBA D and PBA E to the FTL. As a result, data on the PBA D becomes invalid. Invalid data (also referred to as junk data) is data that is not pointed to by any mapping relationship. The user may not access FLASH space of the data because the data is replaced by a new mapping relationship. As data is continuously written to a host, the FLASH storage space gradually decreases until it is used up. If the junk data is not cleared in a timely manner, data cannot be written to the host. All SSDs have a garbage collection mechanism. A basic principle is to move valid data in several blocks to a new block and erase the blocks. In this way, new available blocks are generated.

In addition, the memory 124 further stores a software program, and the processor 123 may manage the hard disk by running the software program in the memory 124. For example, the hard disk can be abstracted into a storage resource pool and then divided into LUNs for the server to use. The LUN here is actually the hard disk seen on the server. Certainly, some centralized storage systems are also file servers, and may provide shared file services for the server.

Data stored in the memory 124 may be presented by using a file system. The file system is a structured data file storage and organization form. As we know, all data in a computer is 0 and 1, and a series of 01 combinations stored on hardware media cannot be distinguished and managed. Therefore, the computer organizes the data by using a concept of "files". The computer organizes, based on structures required by different applications, data used for a same purpose into different types of files. Usually, different suffixes are used to refer to different types, and the computer gives each file a name that is easy to understand and remember. When there are a large number of files, the files are grouped in a specific way. Each group of files are stored in the same directory (or folder). In addition to the files, a catalog may include a lower-level catalog (which is called a subcatalog or a subfolder). All the files and catalogs form a tree structure. The tree structure has a special name: file system. There are many types of file systems, such as FAT, FAT32, and NTFS in Windows. EXT2, EXT3, EXT4, XFS, and BtrFS in Linux, and the like. To facilitate search, level-by-level descending from a root node to the files, names of a catalog, a subcatalog, and a file are combined with special characters (for example. "\" is used in Windows or DOS and "/" is used in a Unix-like system), and such a string of characters is called a file path, for example. "/etc/systemd/system.conf" in Linux or "C:\Windows\System32\taskmgr.exe" in Windows. A path is a unique identifier for accessing a specific file. For example, D:\data\file.exe in Windows is a path of a file, which indicates the file, exe file in a data catalog in partition D.

The file system is built on a block device. The file system records not only file paths, but also blocks that form a file, and blocks that record catalog/subcatalog information. Different file systems have different organizational structures. For ease of management, a block device such as a hard disk may generally be divided into a plurality of logical block devices, namely, hard disk partitions (Partition). Conversely, the capacity and performance of a single medium are limited. A plurality of physical block devices can be combined into a logical block device by using some technologies, such as RAID and JBOD of various levels. The file system may alternatively be built on these logical block devices. In any case, an application on an application server does not need to consider a specific location of a to-be-accessed file on an underlying block device, and needs to send only a file name/ID of the file to the file system. The file system obtains a file path through query based on the file name/ID.

A relatively common file access protocol is NFS, CIFS, SMB, or the like, which is not limited in this embodiment.

The file system in this application is a read/write file system. The read/write file system is a file system that can write files to a storage device or read files from a storage device, for example, FAT, HPFS, NTFS, EXT4, and F2FS.

The file system generally includes a metadata area and a data area. The metadata area includes a superblock and an inode area. The superblock of the metadata area may include content such as control information and a data structure of a file system. The inode area of the metadata area may include description information of a file, for example, a file length and a file type. The file type is, for example, a regular inode, a directory inode, a symbol link inode, or a special inode. Data stored in the data area may be data obtained by performing file-level compression processing based on a lossless compression technology. Data in the data area is stored in physical storage space of a storage medium (for example, a disk or a flash) based on a set of disk blocks. Data of a same file may be stored in consecutive disk blocks, or may be stored in inconsecutive disk blocks in a cross manner.

It should be understood that introducing a concept of a disk block in this application does not mean that the storage medium is limited to a disk, and the disk block may be used to represent small physical storage space obtained by dividing physical storage space of the storage medium.

Certainly, the storage system in this application may further include a scale-out storage system. The scale-out storage system is a system in which data is stored on a plurality of independent storage nodes. A conventional network storage system uses a centralized storage array to store all data. Performance of the storage array is not only a bottleneck of system performance, but also a focus of reliability and security, which cannot meet requirements of large-scale storage applications.

The foregoing briefly describes an application scenario of this application.

In the foregoing storage system, rates of components are sorted based on a data read/write capability, and a descending order is as follows: a central processing unit (central processing unit, CPU)>>a double data rate synchronous dynamic random access memory (double data rate synchronous dynamic random access memory, DDR SDRAM)>a flash chip flash. It can be learned that a data access bottleneck in a storage system is an IO (input output) time overhead of data between a memory and a flash.

To improve overall IO read/write performance of the storage system, files in the memory need to be compressed. Because a metadata area accounts for a small proportion of the entire file system, a data area usually occupies a large storage capacity of a device. Therefore, when data is written into the flash, the data is compressed, and compressed data is written into the flash, so that storage capacity occupation of the flash can be reduced, and a service life of the flash can be prolonged.

Currently, the following data compression manners may be used for Linux read/write file systems, such as F2FS, journaling Flash file system version 2 (JFFS2), and B-tree file system (BTRFS), and Windows read/write file systems, such as NTFS.

Original file data (or referred to as source data) that needs to be compressed is compressed based on a minimum compressible unit (cluster) of a fixed size, and compressed file data (or referred to as compressed data) includes header data and compressed data. The header data is used to represent attribute information of file data, and the compressed data is used to represent content of the file data. The compressed file data is saved to the flash and aligned with a size of 4 KB.

Figure 5:
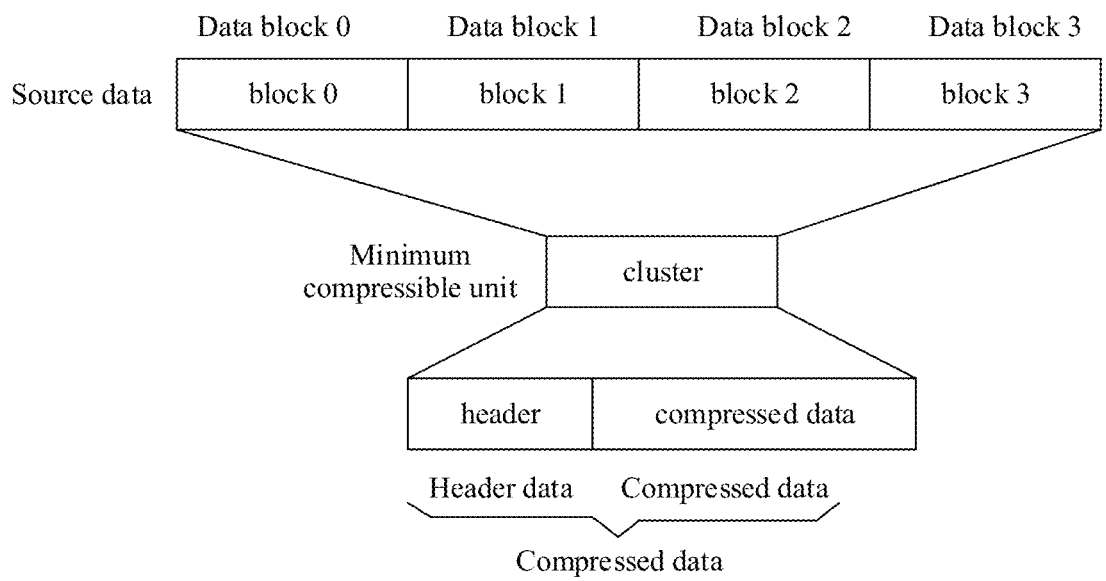
FIG. 5 is a schematic diagram of a fixed input compression mode.

For example, as shown in a schematic diagram of a fixed input compression mode in FIG. 5, four data blocks (block) with consecutive addresses are compressed as a cluster 0 to obtain compressed file data including header data (header)+compressed data. If the size of the compressed file data is less than 4 KB, the compressed file data is stored in the flash in the size of 4 KB.

It is assumed that a size of original file data (or referred to as source data) shown in FIG. 5 is four blocks, a size of each block is 4 KB, and one block is one logical page. Logical pages of the original file data are numbered 0, 1, 2, and 3. The original file data is compressed into compressed file data with a compression ratio of 75%, and the size of the compressed file data is 12 KB. Therefore, the size of the compressed file data is three blocks. Therefore, an actual page of the compressed file data is three pages, that is, a size of a flash actual page that needs to be read to read a single logical page is shown in Table 1.

TABLE 1

| Logical page number | 0 | 1 | 2 | 3 |
|---|---|---|---|---|
| Number (page) of flash pages that are actually read | 3 | 3 | 3 | 3 |

After the compressed file data is saved to the flash, if a target logical page of the original file data needs to be read in the flash, three pages of data of the compressed file data need to be read, and the target logical page can be read only after the compressed file data is decompressed. For example, in a random reading scenario, if original file data of a logical page 0 needs to be read on the flash, original file data of the logical page 0 can be successfully read only after three pages of data of the compressed file data are read and the compressed file data is decompressed. Therefore, the data read efficiency is as follows:

$$\text{Read efficiency} = \frac{\text{Quantity of logical pages that need to be read}}{\text{Quantity of data pages that are actually read}} \times 100\% = $$

$$\frac{1 \text{ page}}{3 \text{ pages}} \times 100\% = 33.3\%$$

Formula 1

It can be learned that, in the random read scenario, read efficiency of the compressed file data obtained in the data compression manner shown in FIG. 5 is relatively low.

To resolve the foregoing technical problem, an embodiment of this application provides a data compression method. In the method, m data blocks in a data area of a readable and writable file system are obtained. The m data blocks are compressed by using a preset compression algorithm, to sequentially obtain n compressed data blocks, where first capacities of all compressed data blocks are the same, and the first capacity represents a quantity of bytes of compressed data that can be included in the compressed data block. Both m and n are positive integers greater than or equal to 1.

The preset compression algorithm may be a compression algorithm corresponding to a fixed output compression mode, for example, a (lempel-ziv 4, LZ4) compression algorithm. Certainly, the preset compression algorithm may alternatively be another compression algorithm. This is not specifically limited in this embodiment of this application.

Figure 6:
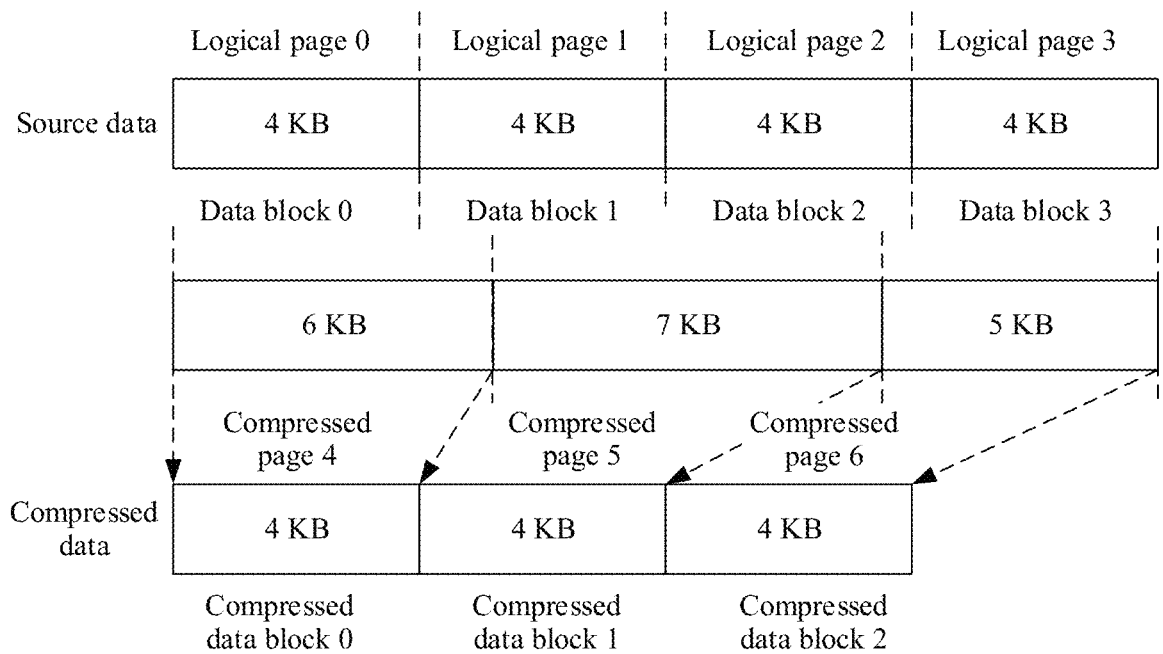
FIG. 6 is a schematic diagram of a fixed output compression mode according to an embodiment of this application.

For example, in an application scenario, as shown in FIG. 6, it is assumed that a size of the source data is 16 KB, and that 4-KB data is a data block and also a logical page is used as an example. Logical pages of the source data are numbered 0, 1, 2, and 3, as shown in a first row of Table 2.

It is assumed that consecutive 16-KB source data of the logical page is divided into 3 pieces, which are respectively 6 KB, 7 KB, and 5 KB. The 3 pieces of data are compressed by using the preset compression algorithm (for example, LZ4) until a size of each piece of compressed data in the compressed data block is 4 KB.

The compressed data block has three data pages, which are respectively numbered as a compressed page 4, a compressed page 5, and a compressed page 6 shown in FIG. 6.

TABLE 2

| Logical page number | 0 | 1 | 2 | 3 |
|---|---|---|---|---|
| Number (page) of flash pages that are actually read | 1 | 2 | 2 | 1 |

It can be learned that all source data of the logical page 0 is compressed in a compressed page 4. Therefore, the logical page 0 is compressed into one page. Some source data of a logical page 1 is compressed in the compressed page 4, and the other source data of the logical page 1 is compressed in a compressed page 5. Therefore, the logical page 1 is compressed into two pages. Some source data of a logical page 2 is compressed in the compressed page 5, and the other source data of the logical page 2 is compressed in a compressed page 6. Therefore, the logical page 2 is compressed into two pages. All source data of a logical page 3 is compressed in a compressed page 6. Therefore, the logical page 3 is compressed into one page.

Therefore, in the random reading scenario, any one or more logical pages may be read. For example, when the logical page 0 is read, only one compressed page needs to be read, as shown in a second row and a second column in Table 2. After decompression, all data of the logical page 0 may be obtained.

In this case, the reading efficiency may be calculated according to the following formula 2:

$$\text{Read efficiency} = \frac{\text{Quantity of logical pages that need to be read}}{\text{Quantity of data pages that are actually read}} \times 100\% = \frac{1 \text{ page}}{1 \text{ page}} \times 100\% = 100\% \quad \text{Formula 2}$$

Reading efficiency of reading the logical page 3 is the same as reading efficiency of reading the logical page 0.

When the logical page 1 is read, three compressed pages need to be read, as shown in a second row and a third column in Table 2. All data of the logical page 1 can be obtained only after data of the compressed page 4 and data of the compressed page 5 are decompressed.

In this case, the reading efficiency may be calculated according to the following formula 3:

$$\text{Read efficiency} = \frac{\text{Quantity of logical pages that need to be read}}{\text{Quantity of data pages that are actually read}} \times 100\% = \frac{1 \text{ page}}{2 \text{ pages}} \times 100\% = 50\% \quad \text{Formula 3}$$

Reading efficiency of reading the logical page 2 is the same as reading efficiency of reading the logical page 1.

In addition, average read efficiency of four logical pages may be calculated according to the following formula 4:

$$\text{Average read efficiency} = \frac{\text{Quantity of logical pages that need to be read}}{\text{Quantity of data pages that are actually read}} \times 100\% = \frac{4 \text{ pages}}{(1+2+2+1) \text{ pages}} \times 100\% = 66.7\% \quad \text{Formula 4}$$

It can be learned from the read efficiency obtained through calculation in formula 2, formula 3, and formula 4 that, in the random read scenario, read efficiency of the data compression method shown in FIG. 6 is far greater than read efficiency of the data compression method shown in FIG. 5.

It can be learned that in this embodiment of this application, the m data blocks in the data area of the readable and writable file system are compressed by using a compression algorithm corresponding to a fixed output compression mode, to sequentially obtain n compressed data blocks of data of a same quantity of bytes, so that each output compressed data block has a fixed size. When a data block is read, read efficiency can be effectively improved, and it can be ensured that data is read in a random read scenario with a small read amplification coefficient.

Figure 8:
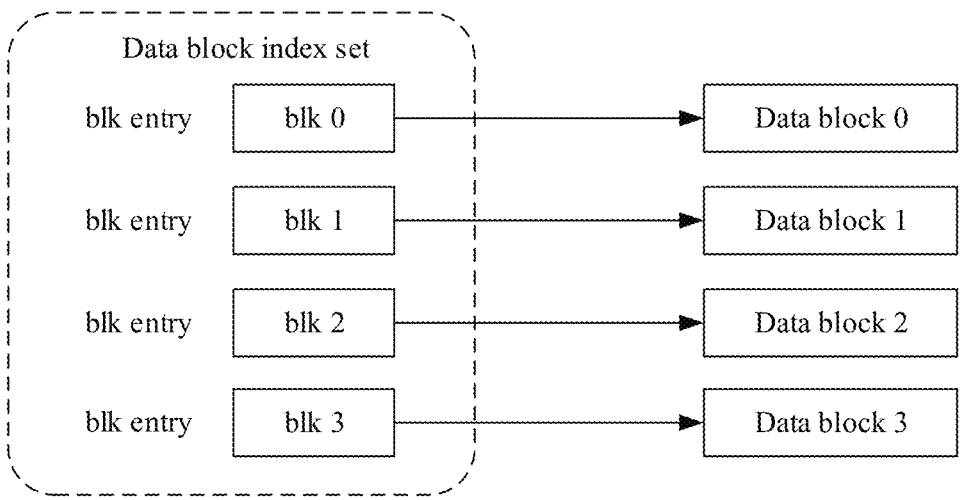
FIG. 8 is a schematic diagram of a data block index in an existing extensible read-only file system.

In addition, FIG. 8 shows a data block indexing manner in an existing extensible read-only file system (extendable read-only file system, erofs). In a data block address array data_addr, a block address is accessed, and points to an address of an actual data block. When the erofs compresses data by using the method shown in FIG. 5 when creating a mirror, because a structure and file content of a storage device (for example, a disk) are fixed, file modification is not supported. However, in actual operation scenarios of the user, many compressed files on the storage device may need to be frequently modified. The erofs does not support this requirement.

A corresponding data block may be found based on the data block index, and it may be understood that the data block index is also an inode, that is, metadata. The inode is an area used to store metadata, that is, an area used to store file-related attribute information, for example, a file creator, a creation date, a size, and a location of a data block. Each inode has a number, and the operating system identifies different files by using different inode numbers. For example, ostensibly, the user opens a file by using a file name. Actually, the system first finds a corresponding inode number based on the file name, obtains inode information based on the inode number, and then finds an address of a data block based on the inode information to read the data.

That is, the inode records an attribute of a file and an actual storage location of the file, that is, a block number. Each block (a common size is 4 KB) can be searched for and located by using the inode. The inode is in Linux, and is referred to as vnode in Unix. Basically, the inode includes at least the following information: (1) file type; (2) file access permission; (3) file owner and group; (4) file size; (5) number of links, that is, a total number of file names pointing to the inode; (6) file state change time (ctime), last access time (atime), and last modified time (mtime); (7) special file attributes, including SUID, SGID, and SBIT; and (8) true point of the file content (pointer).

FIG. 8 shows an existing data block index format. The data block index format does not support scalability, for example, does not support appending write, block reservation, or truncate. The appending write indicates adding new content to an original file without deleting content in the original file. The block reservation indicates that the file system considers the space from which disk blocks can be allocated and reserves the disk blocks if a file size increases. The truncate indicates modifying a file, for example, deleting or adding a file.

For example, as shown in FIG. 8, a data block index is represented by a blk entry, and is briefly referred to as blk for ease of description, blk 1 is an index of a compressed data block 1, and an address of the compressed data block 1 in the storage device is stored in blk 1, blk 2 is an index of a compressed data block 2, and an address of the compressed data block 2 in the storage device is stored in blk 2, blk 3 is an index of a compressed data block 3, and an address of the compressed data block 3 in the storage device is stored in blk 3, blk 4 is an index of a compressed data block 4, and an address of the compressed data block 4 in the storage device is stored in blk 4. Therefore, a location of the compressed data block in the storage device can be determined based on the address stored in the blk.

To enable the read/write file system to support write, overwrite, pre-allocation, truncate, and the like, the data compression method provided in this embodiment of this application further includes: establishing a first index of each of j data blocks corresponding to an $i^{th}$ compressed data block in the n compressed data blocks, and recording a mapping relationship between first indexes and the j data blocks. i is a positive integer greater than or equal to 1 and less than or equal to n. j is a positive integer greater than or equal to 1 and less than or equal to m. The first index is used to identify a storage location, in a storage medium, of each data block included in the j data blocks, and attribute information included in each of the j data blocks. Certainly, the first index is further used to identify a storage location of the $i^{th}$ compressed data block in the storage medium, and attribute information included in each of the j data blocks.

The attribute information includes at least one of the following:
  a first attribute, used to represent whether a storage location of a compressed data block into which a data block is compressed is pre-allocated;
  a second attribute, used to represent whether a data page of a data block is valid, that is, whether the data page is a normal data page or an empty data page, where the empty data page may be understood as a blank data page;
  a third attribute, used to represent whether a data page of a data block is a first compressed page of a compressed data block of the data block;
  a fourth attribute, used to represent whether a data page of a data block is included in compressed data pages of two compressed blocks;
  a fifth attribute, used to represent whether a data page of a data block is a compressed page of a compressed data block obtained by compressing the data block;
  a sixth attribute, used to represent an index address of a compressed data block in which a data page of a data block is located; and
  a seventh attribute, used to represent that when a data page of a data block belongs to a first compressed page of a compressed data block of the data block, an attribute value of the seventh attribute is an offset of the data block in a set corresponding to the compressed data block; and when the data page of the data block does not belong to the first compressed page of the compressed data block of the data block, the attribute value of the seventh attribute is a distance between the data page of the data block and the first compressed page of the compressed data block.

Figure 7:
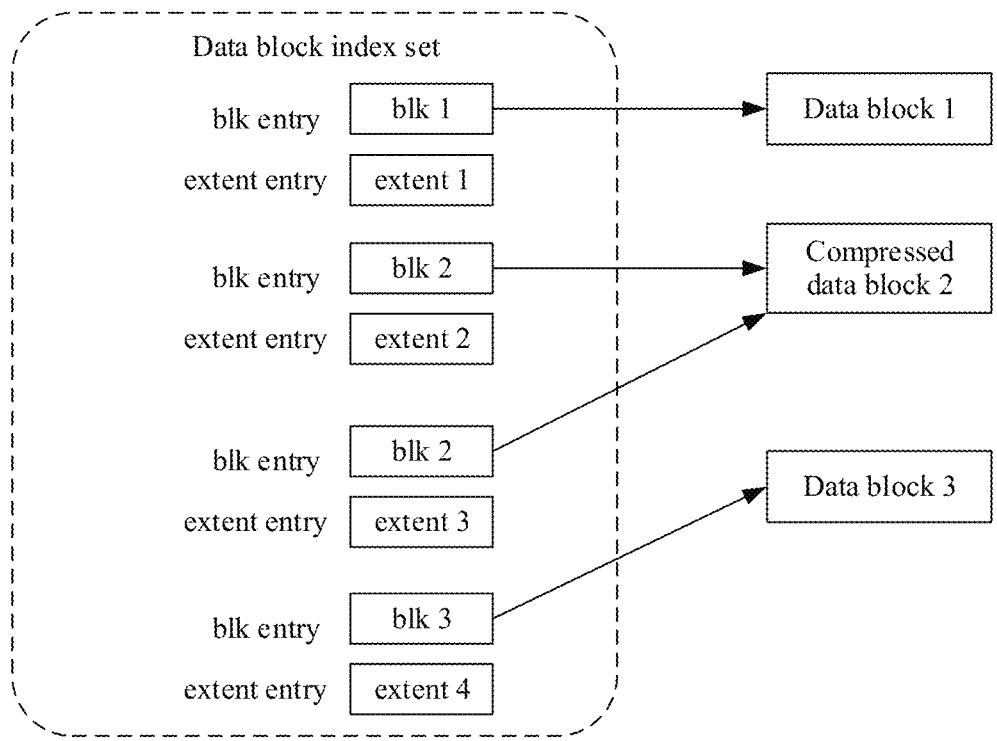
FIG. 7 is a schematic diagram of a data block index according to an embodiment of this application.

For example, as shown in FIG. 7, the first index of the data block includes: a blk entry, which stores an address of the data block or the compressed data block; and an extent entry, which stores extended attribute information. Each extent entry is in a one-to-one correspondence with a blk entry, and each data page has a corresponding extent entry and a corresponding blk entry.

A set of extent entry members is represented in the following manner.

For example, as shown in the set A, members included in the data block index may be shown in the set A. It should be noted that each data page has a corresponding set A.

```
A {
    is_reserved,
    is_valid,
    is_compress,
    first_page,
    cross_block,
    blkidx,
    offset,
    .....
    other extendable attributes,
};
meanings of the set members are described as follows:
is_reserved is the first attribute;
is_valid is the second attribute;
first_page is the third attribute;
cross_block is the fourth attribute;
is_compress is the fifth attribute;
blkidx is the sixth attribute; and
ofs is the seventh attribute.
```

It can be learned that, when the method shown in FIG. 6 is used to compress data in a read/write file system, an attribute included in an index of a data block shown in FIG. 7 may be modified, so that a compressed file on a storage device may be modified.

The following describes the data compression method provided in embodiments of this application with reference to a specific example.

Figure 9A:
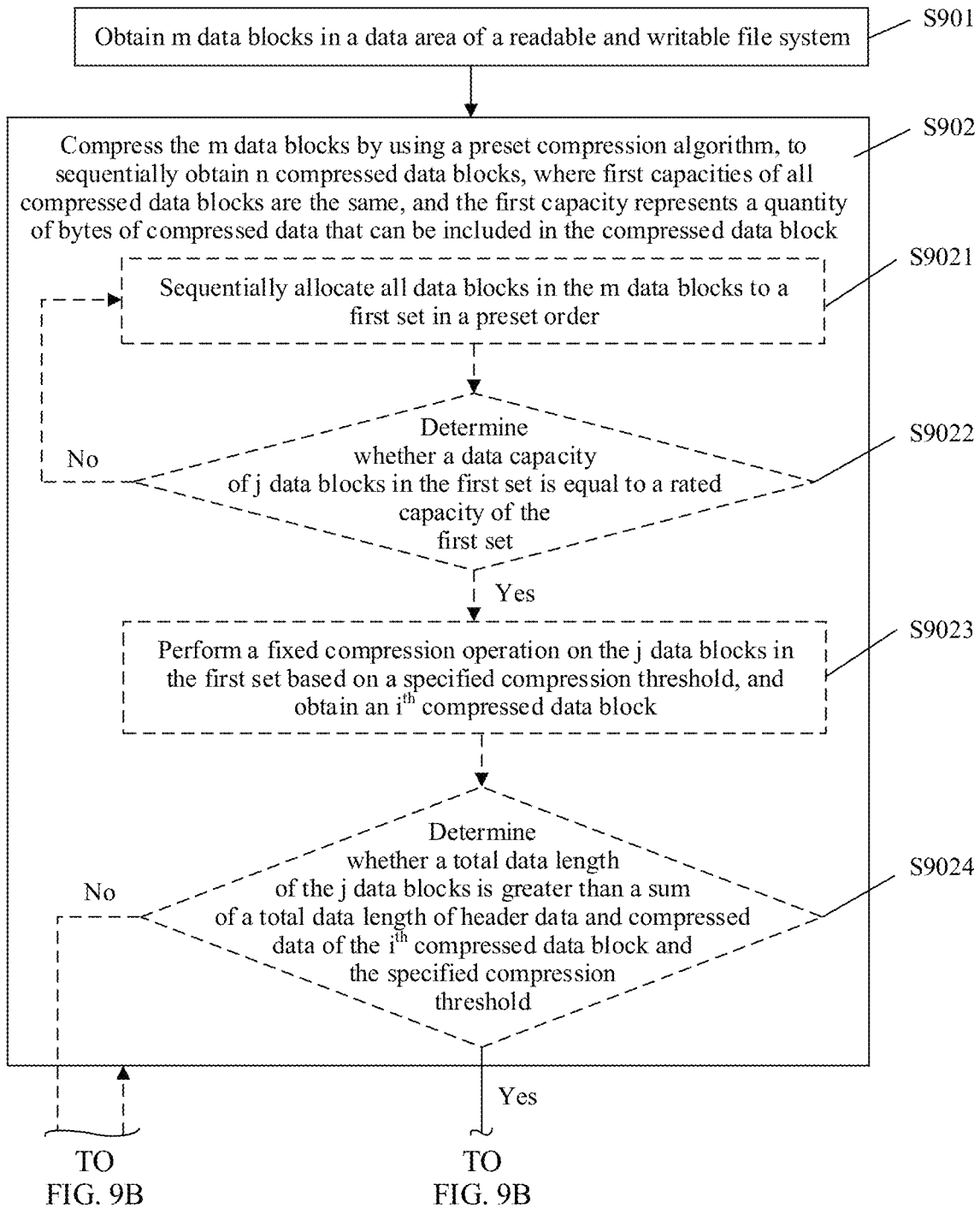
FIG. 9A and FIG. 9B are schematic flowcharts of a data compression method according to an embodiment of this application.
Figure 9B:
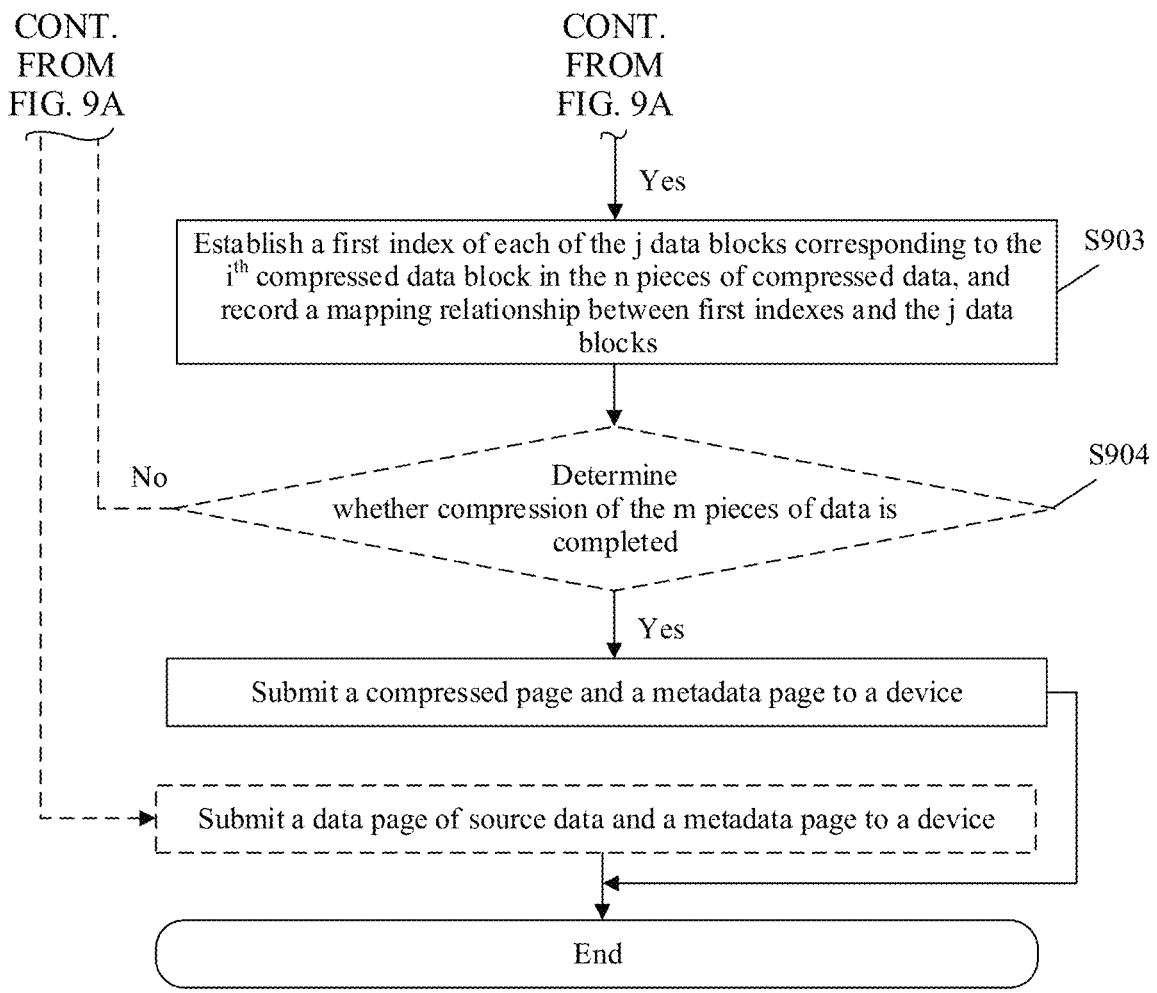

FIG. 9A and FIG. 9B are schematic flowcharts of a data compression method according to an embodiment of this application. As shown in FIG. 9A and FIG. 9B, the method includes the following steps.

S901: Obtain m data blocks in a data area of a readable and writable file system, where m is a positive integer greater than or equal to 1.

The m data blocks may be understood as data blocks that need to be written back. The write-back may mean that during a write operation, data is first written into a memory for caching, but is not immediately written into a storage device (for example, a disk). The data cached in the memory is written into the storage device only under some specific conditions or operations (for example, a refresh mechanism or a sync operation).

S902: Compress the m data blocks by using a preset compression algorithm, to sequentially obtain n compressed data blocks, where first capacities of all compressed data blocks are the same, the first capacity represents a quantity of bytes of compressed data that can be included in the compressed data block, and n is a positive integer greater than or equal to 1.

The preset compression algorithm may be an LZ4 compression algorithm, or certainly, may be another compression algorithm with fixed output. This is not specifically limited in this embodiment of this application.

m may be any positive integer. For example, m is 4, m is 10, or m is 20.

S902 may be specifically implemented as follows.

S9021: Sequentially allocate all data blocks in the m data blocks to a first set in a preset order.

The preset order may be an order of consecutive storage addresses, that is, a continuous order of the m data blocks.

The first set may be referred to as a minimum compressible unit (cluster). In other words, the first set is a minimum compressible data block set, for example, a 6-KB data block set, a 7-KB data block set, and a 5-KB data block set shown in FIG. 6.

For example, the m data blocks are mapped to a segment of consecutive addresses in the storage medium. It is assumed that a data block is used as a start point, and data sets of a fixed size are sequentially divided according to an order of addresses of data blocks mapped in the storage medium. As shown in FIG. 6, a data block 0 and ½ data of a data block 1 form a 6-KB data set; the ½ data of the data block 1, ¾ data of a data block 2, and a blank data page form a 7-KB data set; and ¼ data of the data block 2 and a data block 3 form a 5-KB data set.

S9022: Determine whether a data capacity of j data blocks in the first set is equal to a rated capacity of the first set, where j is a positive integer greater than or equal to 1 and less than or equal to m. If the data capacity of the j data blocks is not equal to the rated capacity of the first set, S9021 is performed; or if the data capacity of the j data blocks is equal to the rated capacity of the first set, S9023 is performed.

S9023: Perform a fixed compression operation on the j data blocks in the first set based on a specified compression threshold, and obtain an $i^{th}$ compressed data block.

The specified compression threshold is used to represent a compression ratio. For example, an expression formula for the specified compression threshold may be:

Specified compression threshold=Total data length−Total data length*Compression ratio

S9024: Determine whether a total data length of the j data blocks is greater than a sum of a total data length of header data and compressed data of the $i^{th}$ compressed data block and the specified compression threshold. If the total data length of the j data blocks is greater than the sum of the total data length of the header data and the compressed data of the $i^{th}$ compressed data block and the specified compression threshold, S903 is performed. If the total data length of the j data blocks is not greater than the sum of the total data length of the header data and the compressed data of the $i^{th}$ compressed data block and the specified compression threshold, a source data page is submitted to a flash.

S903: Establish a first index of each of j data blocks corresponding to the $i^{th}$ compressed data block in the n compressed data blocks, and record a mapping relationship between first indexes and the j data blocks, where i is a positive integer greater than or equal to 1 and less than or equal to n, and j is a positive integer greater than or equal to 1 and less than or equal to m.

It should be understood that, when a compressed data block is compressed, an index of each of data blocks corresponding to the compressed data block is established.

The first index is used to identify a storage location, in a storage medium, of each data block included in the j data blocks, and attribute information included in each of the j data blocks.

For example, an f2fs read/write file system of Linux is used as an example, and a first index format of a data block in the F2fs may be as follows.

A data structure of the attribute information included in the first index may be:

for example, an entry data structure:
```
struct Entry{
    unsigned int is_valid:1;      /* indicate entry is valid or not */
    unsigned int is_compress:1;   /* indicate page is compressed */
    unsigned int first_page:1;    /* first page in compressed block */
    unsigned int cross_block:1;   /* cross two compressed blocks */
    unsigned int blkidx:8;        /* index in block address table */
    /*
    * when .first_page is one, it indicates:
    * offset in raw page, which is start offset of compressed blocks
    * when .first_page is zero, it indicates:
    * distance from first page in compressed block
    /*
    unsigned int ofs:12;
    unsigned int padding:8;       /* padding */
} __packed;
F2fs_inode index structure
struct f2fs_inode {
    __le32 i_addr[X];
    __le32 entry[X];
};
(3) direct_node index structure
struct direct_node {
    __le32 addr[X];
    __le32 entry[X];
};
``` the attribute information may include at least one of the following:

a first attribute (is_reserved), used to represent whether a storage location of a compressed data block into which a data block is compressed is pre-allocated;

a second attribute (is_valid), used to represent whether a data page of a data block is valid;

a third attribute (first_page), used to represent whether a data page of a data block is a first compressed page of a compressed data block of the data block;

a fourth attribute (cross_block), used to represent whether a data page of a data block is included in compressed data pages of two compressed blocks;

a fifth attribute (is_compress), used to represent whether a data page of a data block is a compressed page of a compressed data block obtained by compressing the data block;

a sixth attribute (blkidx), used to represent an index address of a compressed data block in which a data page of a data block is located; and a seventh attribute (ofs), used to represent that when a data page of a data block belongs to a first compressed page of a compressed data block of the data block, an attribute value of the seventh attribute is an offset of the data block in a set corresponding to the compressed data block; and when the data page of the data block does not belong to the first compressed page of the compressed data block of the data block, the attribute value of the seventh attribute is a distance between the data page of the data block and the first compressed page of the compressed data block.

Figure 10A:
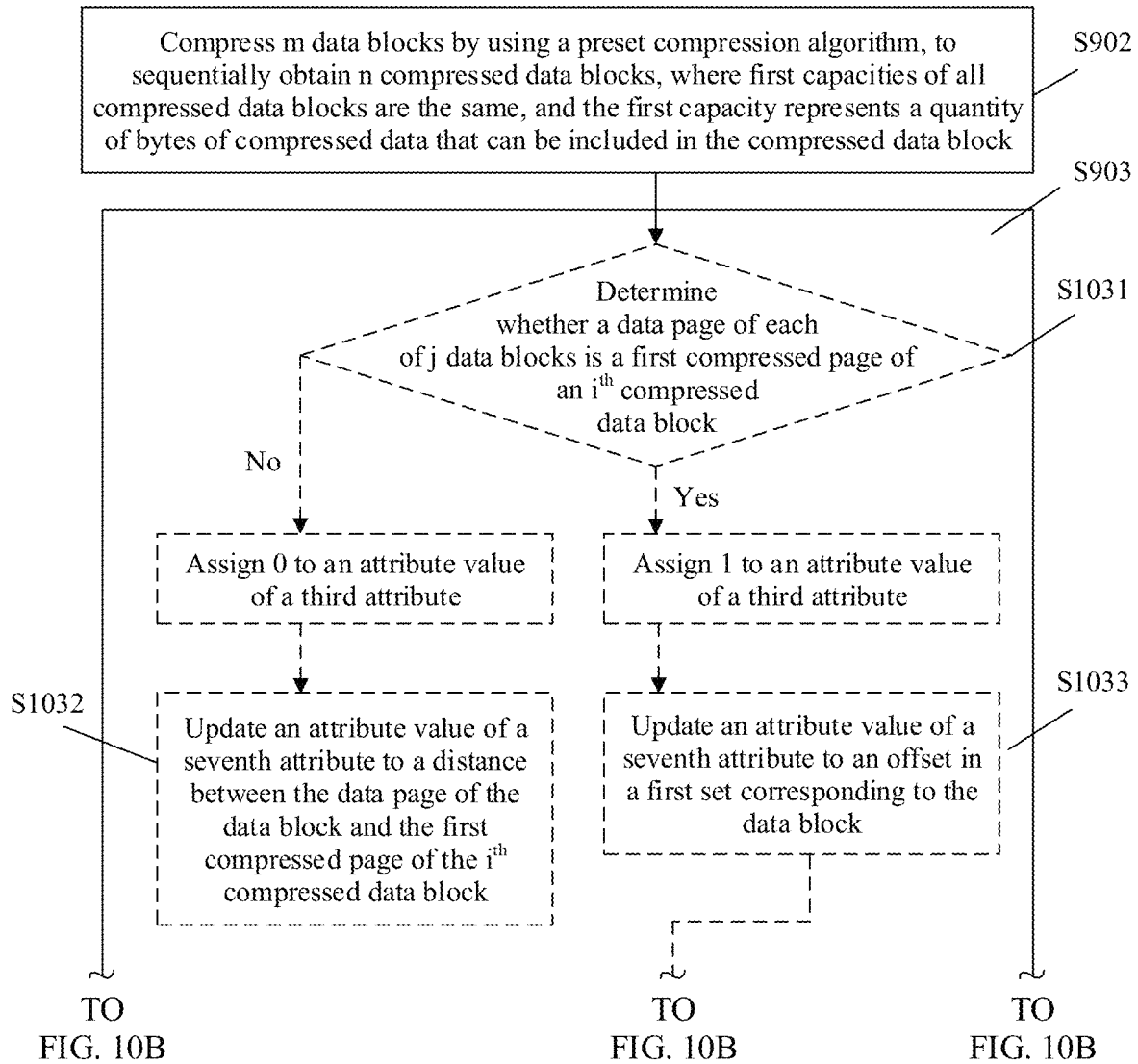
FIG. 10A and FIG. 10B are schematic flowcharts of updating a data block index according to an embodiment of this application.
Figure 10B:
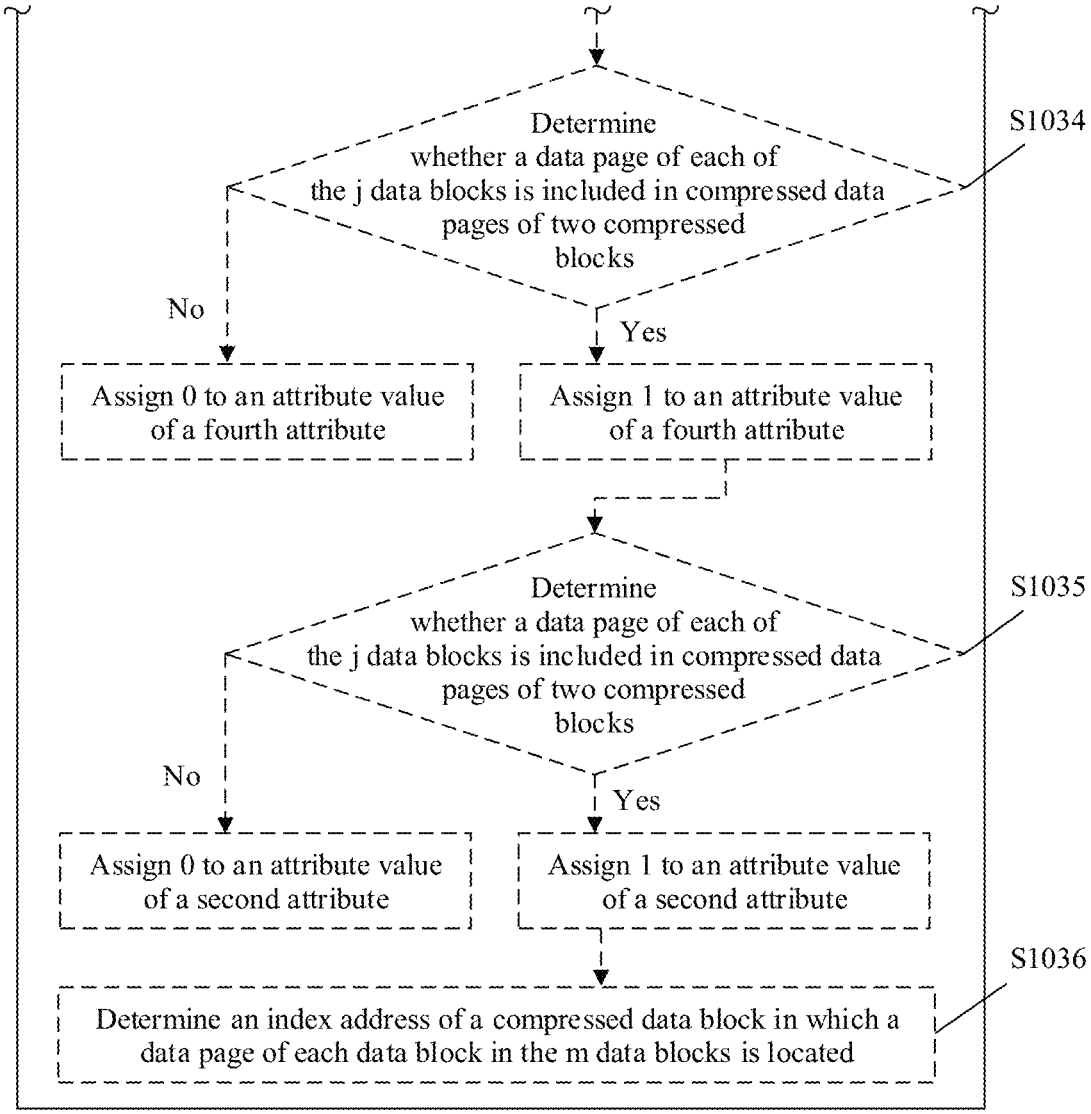

In a specific and possible implementation, FIG. 10A and FIG. 10B are schematic flowcharts of updating a data block index according to an embodiment of this application. As shown in FIG. 10A and FIG. 10B, the attribute information may include the third attribute (first_page) and the seventh attribute (ofs), and S903 may be specifically implemented as follows.

S1031: Determine whether a data page of each of the j data blocks is a first compressed page of the $i^{th}$ compressed data block. If the data page of each of the j data blocks is the first compressed page of the $i^{th}$ compressed data block, assign 1 to an attribute value of the third attribute; or if the data page of each of the j data blocks is not the first compressed page of the i$^{th}$ compressed data block, assign 0 to an attribute value of the third attribute.

S1032: When the attribute value of the third attribute is 1, update an attribute value of the seventh attribute to an offset in the first set corresponding to the data block.

S1033: When the attribute value of the third attribute is 0, update the attribute value of the seventh attribute to a distance between the data page of the data block and the first compressed page of the i$^{th}$ compressed data block.

Certainly, the attribute information may further include the fourth attribute (cross_block), and S103 may be specifically implemented as follows.

S1034: Determine whether a data page of each of the j data blocks is included in compressed data pages of two compressed blocks. If the data page of each of the j data blocks is included in compressed data pages of two compressed blocks, assign 1 to an attribute value of the fourth attribute; or if the data page of each of the j data blocks is not included in compressed data pages of two compressed blocks, assign 0 to an attribute value of the fourth attribute.

Certainly, the attribute information may further include the second attribute (is_valid), and S103 may be specifically implemented as follows.

S1035: Determine whether a data page of each of the j data blocks is valid. If the data page of each of the j data blocks is valid, assign 1 to an attribute value of the second attribute; or if the data page of each of the j data blocks is invalid, assign 0 to an attribute value of the second attribute.

Certainly, the attribute information may further include the sixth attribute (blkidx), and S103 may be specifically implemented as follows.

S1036: Determine an index address of a compressed data block in which a data page of each data block in the m data blocks is located.

Compression is performed according to a sequence of storage locations of the m data blocks in the memory by using a size of a minimum fixed compression unit (for example, the first set). When a first time of compression is completed (that is, a first compressed data block is obtained), data pages of complete data blocks corresponding to the first compressed data block are all in an index position of the first compressed data block. For example, data blocks corresponding to the first compressed data block include: a part of data of a data block 0, a data block 1, a data block 2, and a data block 3. The complete data blocks corresponding to the first compressed data block are the data block 0, the data block 1, and the data block 2. Therefore, data pages of the data block 0, the data block 1, and the data block 2 are on the index position of the first compressed data block.

It should be noted herein that, in addition to the seventh attribute that needs to be attached to the third attribute, data block index update procedures corresponding to other attributes are independent of each other. A sequence of data block index update procedures corresponding to the first attribute, the second attribute, the fourth attribute, the fifth attribute, and the sixth attribute is not specifically limited in this embodiment of this application.

Figure 11:
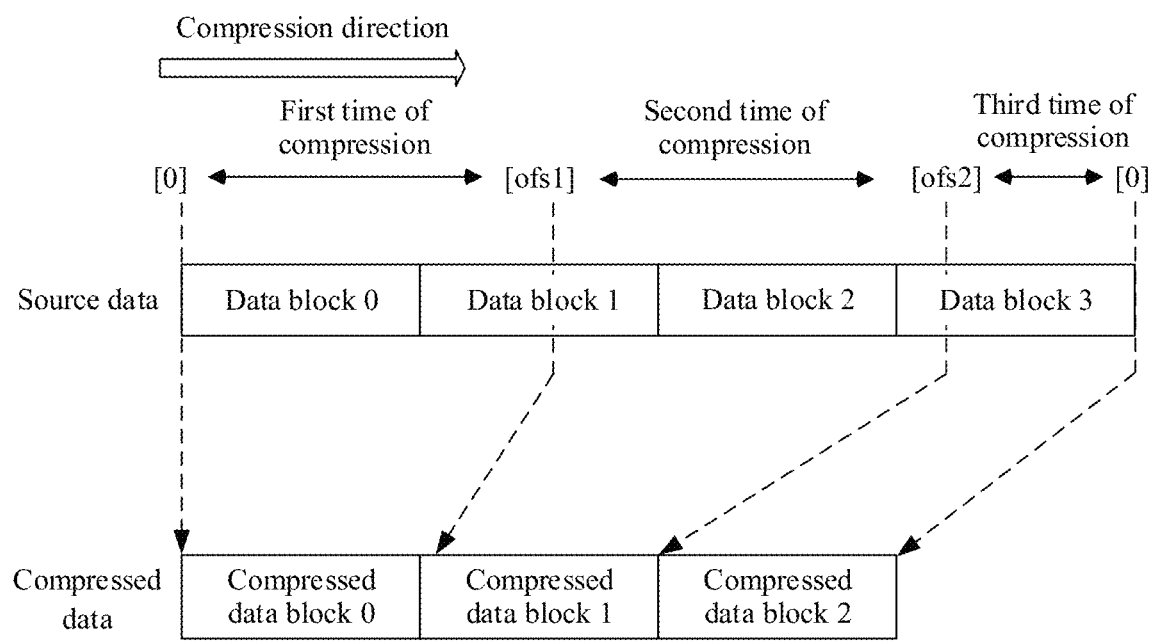
FIG. 11 is a schematic diagram of a data block index relationship during data compression according to an embodiment of this application.

For example, it is assumed that, as shown in FIG. 11, the m data blocks include a data block 0 (that is, block 0), a data block 1 (that is, block 1), a data block 2 (that is, block 2), and a data block 3 (that is, block 3). A segment of consecutive addresses is mapped in the memory by using the block 0, the block 1, the block 2, and the block 3. When compression is performed by using a size of a minimum fixed compression unit (for example, the first set) according to a sequence of a segment of consecutive addresses that are mapped in the memory by using the block 0, the block 1, the block 2, and the block 3 (for example, a compression direction from left to right in FIG. 11), during the compression:

when a part of the block 0 and the block 1 reaches a minimum fixed compression unit (for example, 4 KB), the first time of compression is performed to obtain a first compressed data block (compress blk 0). In this case, a data block index of the block 0 is established, as shown in Table 3.

TABLE 3

| Data block number (BlkNum) | first_page | cross_block | blkidx | ofs | is_valid |
|---|---|---|---|---|---|
| block 0 | 1 | 0 | 0 | 0 | 1 |

With reference to FIG. 10A and FIG. 10B, it can be learned that a data page of the block 0 falls on the first compressed page of the first compressed data block. Therefore, 1 is assigned to first_page. The data page of the block 0 falls only on the first compressed page of the first compressed data block. Therefore, 0 is assigned to cross_block. An index address, in the first compressed data block, of the data page of the block 0 is a number of the first compressed data block (compress blk 0). Therefore, 0 is assigned to blkidx. The data page of the block 0 falls on the first compressed page of the first compressed data block, and an offset of the block 0 in a first set corresponding to the block 0 is 0. Therefore, 0 is assigned to ofs. The data page of the block 0 is a valid data page. Therefore, 1 is assigned to is_valid.

When a remaining part of the block 1, and a part of the block 2 and the block 3 reach a minimum fixed compression unit (for example, 4 KB), a second time of compression is performed, to obtain a second compressed data block (compress blk 1). In this case, data block indexes of the block 1 and the block 2 are established, as shown in Table 4.

TABLE 4

| Data block number (BlkNum) | first_page | cross_block | blkidx | ofs | is_valid |
|---|---|---|---|---|---|
| Block 1 | 1 | 1 | 1 | Ofs1 | 1 |
| Block 2 | 0 | 0 | 1 | 1 | 1 |

With reference to FIG. 10A and FIG. 10B, it can be learned that a data page of the block 1 falls on a first compressed page of a second compressed data block. Therefore, 1 is assigned to first_page. The data page of the block 1 falls on a compressed page of the first compressed data block and a compressed page of the second compressed data block. Therefore, 1 is assigned to cross_block. An index address, in the second compressed data block, of the data page of the block 1 is a number of the second compressed data block (compress blk 1). Therefore, 1 is assigned to blkidx. The data page of the block 1 falls on a first compressed page of the second compressed data block, and an offset of the block 1 in the set of data blocks is Ofs1. Therefore, a value Ofs1 is assigned to ofs. The data page of the block 1 is a valid data page. Therefore, 1 is assigned to is_valid.

Similarly, a data page of the block 2 does not fall on the first compressed page of the second compressed data block. Therefore, 0 is assigned to first_page. The data page of the block 2 falls only on a compressed page of the second compressed data block. Therefore, 0 is assigned to cross_block. An index address, in the second compressed data block, of the data page of the block 2 is a number of the second compressed data block (compress blk 1). Therefore, 1 is assigned to blkidx. The data page of the block 2 does not fall on the first compressed page of the second compressed data block, and a distance between the data page of the block 2 and the first compressed page of the first compressed data block is 1. Therefore, 1 is assigned to ofs. The data page of the block 2 is a valid data page. Therefore, 1 is assigned to is_valid.

When a remaining part of the block 3 reaches the minimum fixed compression unit (for example, 4 KB), a third time of compression is performed to obtain a third compressed data block (compress blk 2). In this case, a data block index of the block 3 is established, as shown in Table 5.

TABLE 5

| Data block number (BlkNum) | first_page | cross_block | blkidx | ofs | is_valid |
|---|---|---|---|---|---|
| block 3 | 1 | 1 | 2 | Ofs2 | 1 |

With reference to FIG. 10A and FIG. 10B, it can be learned that a data page of the block 3 falls on a first compressed page of a third compressed data block. Therefore, 1 is assigned to first_page. The data page of the block 1 falls on a compressed page of the second compressed data block and a compressed page of the third compressed data block. Therefore, 1 is assigned to cross_block. An index address, in the third compressed data block, of the data page of the block 1 is a number of the second compressed data block (compress blk 2). Therefore, 2 is assigned to blkidx. A data page of the block 3 falls on a first compressed page of the third compressed data block, and an offset of the block 3 in the set of data blocks is Ofs2. Therefore, a value Ofs2 is assigned to ofs. The data page of the block 3 is a valid data page. Therefore, 1 is assigned to is_valid.

S904: Determine whether compression of the m pieces of data is completed. If the compression is completed, the compressed page of the compressed data block is submitted to a device. If the compression is not completed, perform S902.

Figure 12:
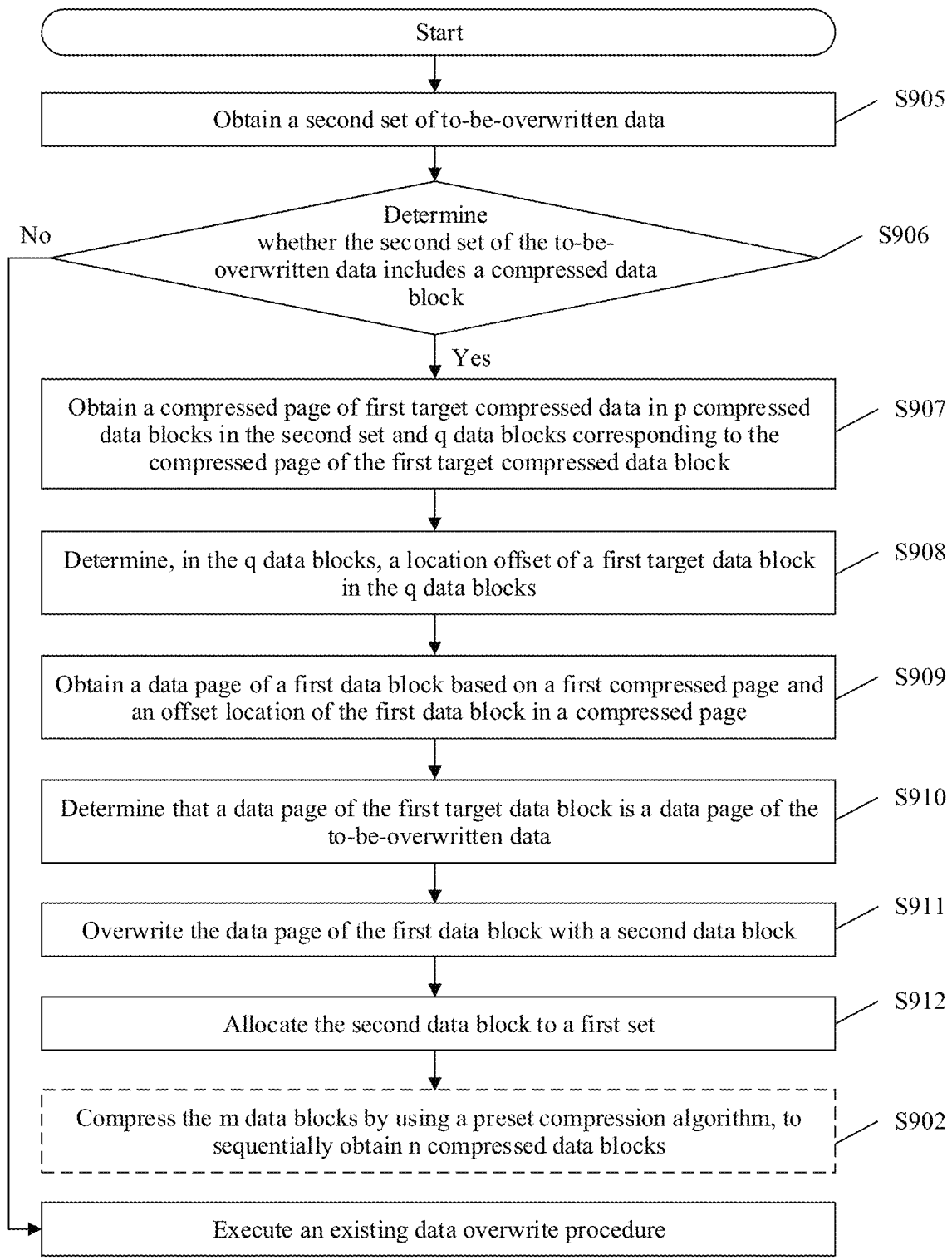
FIG. 12 is a schematic flowchart of another data compression method according to an embodiment of this application.

In some embodiments, FIG. 12 is a schematic flowchart of a data compression method according to an embodiment of this application. As shown in FIG. 12, before S902 is performed, the data compression method provided in this embodiment of this application further includes the following steps.

S905: Obtain a second set of to-be-overwritten data.

S906: Determine whether the second set of the to-be-overwritten data includes a compressed data block. If the second set of the to-be-overwritten data includes a compressed data block, S907 is performed: or if the second set of the to-be-overwritten data does not include a compressed data block, an existing data overwrite procedure is performed.

The second set may include p compressed data blocks, and p is a positive integer greater than or equal to 1.

S907: Obtain a compressed page of a first target compressed data block in the p compressed data blocks in the second set and q data blocks corresponding to the compressed page of the first target compressed data block, where q is a positive integer greater than or equal to 1.

S908: Determine, in the q data blocks, a location offset of a first target data block in the q data blocks.

Specifically; an index address of each compressed data block in the second set is read, and the compressed data block is decompressed to obtain data blocks corresponding to the compressed data block. Then, a location offset of each of the q data blocks is determined.

S909: Obtain a data page of a first data block based on the first compressed page and an offset location of a first data block in a compressed page.

S910: Determine that a data page of the first target data block is a data page of the to-be-overwritten data.

S911: Overwrite the data page of the first data block with a second data block.

S912: Allocate the second data block to the first set.

In conclusion, in the read/write file system f2fs, the following benefit effect can be achieved by compressing a specified so file, a vdex file, an odex file, and the like by using the fixed output compression mode provided in this embodiment of this application: for example, in a process of installing 40 applications on an electronic device, each application can obtain an average time benefit of 12%. During application installation, the so file has an appending write procedure, and both the vdex file and the odex file have an overwrite procedure. An average boot gain of 40 applications is 8% higher than a boot gain of compressed data in a fixed input compression mode.

Figure 14:
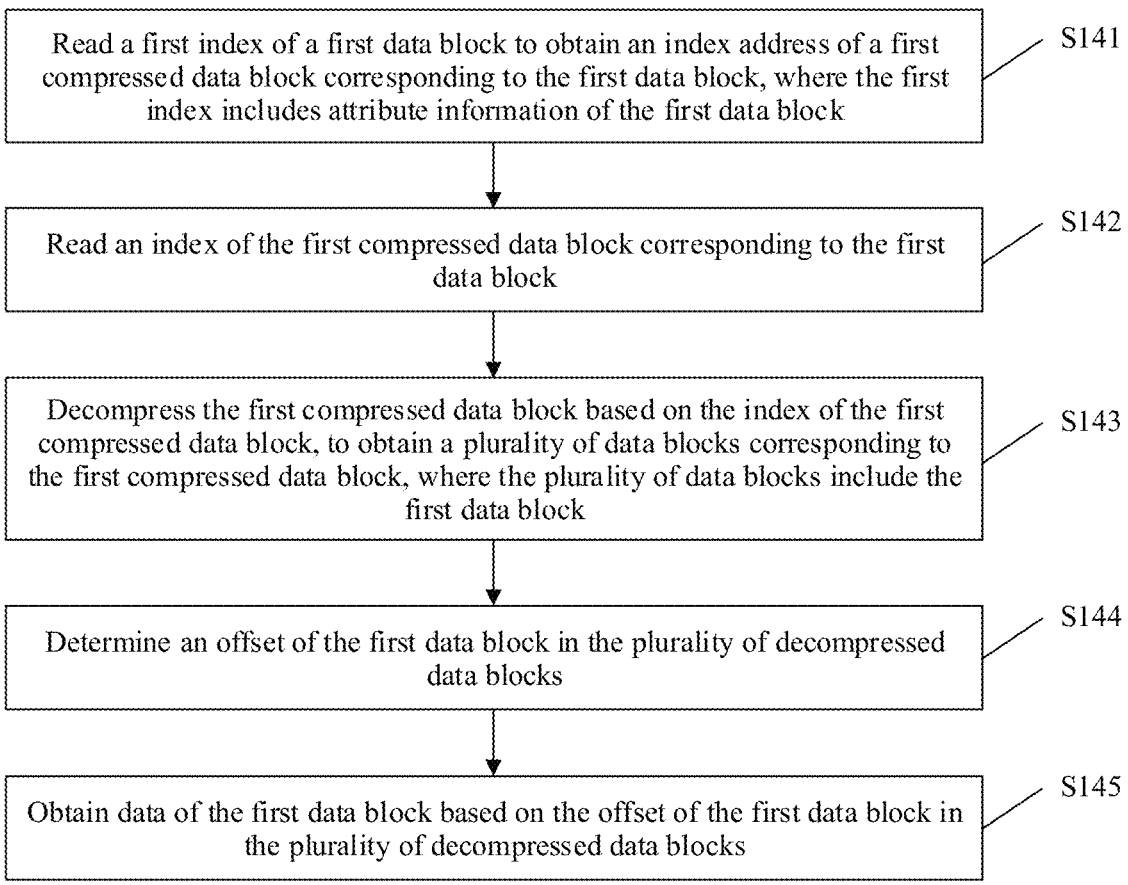
FIG. 14 is a schematic flowchart of a data reading procedure according to an embodiment of this application.

According to the data compression method provided in this embodiment of this application, after data is compressed by using the foregoing data compression method, data needs to be read. FIG. 14 is a schematic flowchart of a data reading procedure according to an embodiment of this application. As shown in FIG. 14, the data reading procedure is as follows.

S141: Read a first index of a first data block to obtain an index address of a first compressed data block corresponding to the first data block, where the first index includes attribute information of the first data block.

The attribute information of the first data block may include at least one of a first attribute to a seventh attribute in the foregoing embodiment. For example, the attribute information of the first data block includes a third attribute (first_page), a fourth attribute (cross_block), a sixth attribute (blkidx), and a seventh attribute (ofs).

Figure 13:
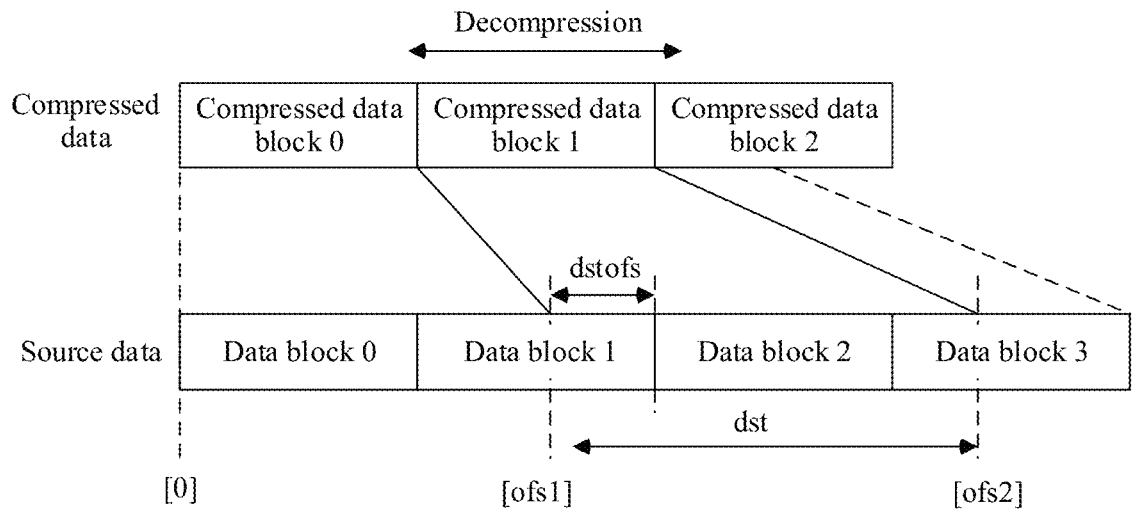
FIG. 13 is a schematic diagram of a data block index relationship in an overwrite or read procedure according to an embodiment of this application.

In an overwrite scenario and a read-only scenario, it is assumed that the first data block is a data block 2 (block 2)

shown in FIG. 13. Attribute information such as ofs, cross_block, and blkidx of the block 2 is read, to obtain an index address of a first compressed data block corresponding to the block 2. Specifically, Table 4 is still used. When it is read that a value assigned to ofs of the block 2 is 1, it may be determined that a data page of the block 2 does not fall on a first compressed page of a second compressed data block, and a distance between a data page of the block 2 and a first compressed page of the first compressed data block may be obtained as 1. Then, when it is read that a value assigned to cross_block of the block 2 is 0, it may be determined that a data page of the block 2 falls only on a compressed page of the first compressed data block, and does not fall on a compressed page of another compressed data block. Then, when it is read that a value assigned to blkidx of the block 2 is 1, it may be determined that an index address, in the first compressed data block, of a data page of the block 2 may be a number of the first compressed data block, that is, the index address of the first compressed data block may be obtained as 1.

S142: Read an index of the first compressed data block corresponding to the first data block.

S143: Decompress the first compressed data block based on the index of the first compressed data block, to obtain a plurality of data blocks corresponding to the first compressed data block, where the plurality of data blocks include the first data block.

Specifically, the first compressed data block is found on the device based on the index of the first compressed data block. After the first compressed data block is found, the first compressed data block is parsed, and a plurality of parsed data blocks are obtained. For example, as shown in FIG. 13, the first compressed data block is compress blk 1, and after the compress blk 1 is parsed, the following data is obtained: a part of data of a data block 1 (block 1), a data block 2 (block 2), and a part of data of a data block 3 (block 3).

S144: Determine an offset of the first data block in the plurality of decompressed data blocks.

Specifically, it may be learned, based on the attribute information of the first data block, that the first data block is the data block 2 (block 2) shown in FIG. 13. As shown in FIG. 13, an expression of an offset (dstofs) of the block 2 in the plurality of data blocks parsed from the compress blk 1 is:

dstofs=block_size−ofs1% block_size, where dstofs indicates an offset of the block 2 in the plurality of data blocks parsed from the compress blk 1, block_size indicates a length of the data block, ofs1 indicates an attribute value of the seventh attribute, and ofs1% block_size indicates a remainder.

S145: Obtain data of the first data block based on the offset of the first data block in the plurality of decompressed data blocks.

The foregoing example is still used. The first data block is the block 2. As shown in FIG. 13 and Table 4, data of the block 2 may be obtained.

Specifically, the communications system in this possible design is configured to perform functions of each device in the data compression method shown in FIG. 9A and FIG. 9B, and therefore can achieve a same effect as the foregoing data compression method.

Figure 15:
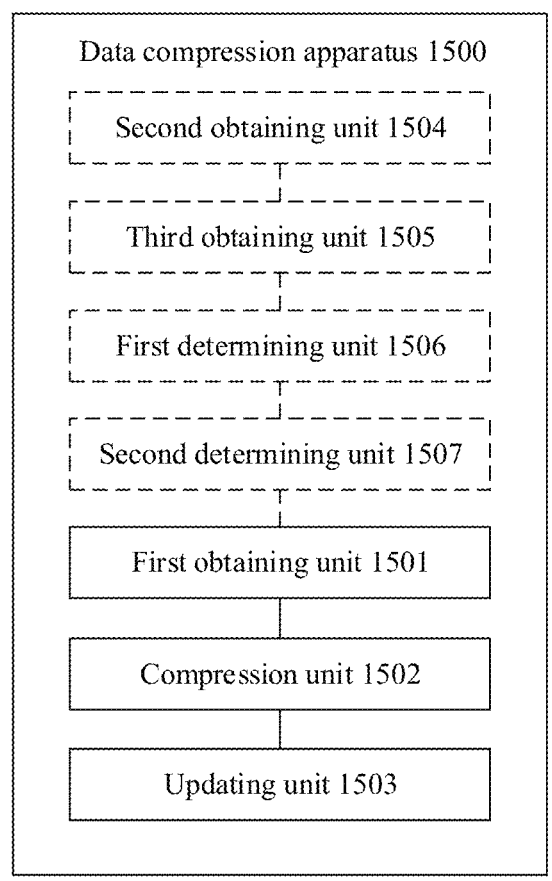
FIG. 15 is a schematic diagram of a structure of a data compression apparatus according to an embodiment of this application.

FIG. 15 shows a data compression apparatus according to an embodiment of this application. The data compression apparatus 1500 may include: a first obtaining unit 1501, configured to obtain m data blocks in a data area of a readable and writable file system, where m is a positive integer greater than or equal to 1; a compression unit 1502, configured to compress the m data blocks by using a preset compression algorithm, to sequentially obtain n compressed data blocks, where first capacities of all compressed data blocks are the same, the first capacity represents a quantity of bytes of compressed data that can be included in the compressed data block, and n is a positive integer greater than or equal to 1; and an updating unit 1503, configured to: establish a first index of each of j data blocks corresponding to an $i^{th}$ compressed data block in the n compressed data blocks, and record a mapping relationship between first indexes and the j data blocks. i is a positive integer greater than or equal to 1 and less than or equal to n, and j is a positive integer greater than or equal to 1 and less than or equal to m. The first index is used to identify a storage location, in a storage medium, of each data block included in the j data blocks, and attribute information included in each of the j data blocks.

In a specific and possible implementation, the compression unit 1502 is configured to sequentially allocate all data blocks in the m data blocks to a first set in a preset order. When a data capacity of the j data blocks in the first set is equal to a rated capacity of the first set, a compression operation is performed on the j data blocks based on a specified compression threshold, to obtain the $i^{th}$ compressed data block.

In a specific and possible implementation, the updating unit 1503 is configured to: when a sum of a total data length of header data and compressed data of the $i^{th}$ compressed data block and the specified compression threshold is less than or equal to a total data length of the j data blocks, establish the first index of each of the j data blocks.

In a specific and possible implementation, the attribute information includes at least one of the following: a first attribute, used to represent whether a storage location of a compressed data block into which a data block is compressed is pre-allocated; a second attribute, used to represent whether a data page of a data block is valid; a third attribute, used to represent whether a data page of a data block is a first compressed page of a compressed data block of the data block; a fourth attribute, used to represent whether a data page of a data block is included in compressed data pages of two compressed blocks; a fifth attribute, used to represent whether a data page of a data block is a compressed page of a compressed data block obtained by compressing the data block; a sixth attribute, used to represent an index address of a compressed data block in which a data page of a data block is located; and a seventh attribute, used to represent that when a data page of a data block belongs to a first compressed page of a compressed data block of the data block, an attribute value of the seventh attribute is an offset of the data block in a set corresponding to the compressed data block; and when the data page of the data block does not belong to the first compressed page of the compressed data block of the data block, the attribute value of the seventh attribute is a distance between the data page of the data block and the first compressed page of the compressed data block.

In a specific and possible implementation, the attribute information includes the third attribute, and the updating unit 1503 is further configured to: when a data page of each of the j data blocks is a first compressed page of the $i^{th}$ compressed data block, assign 1 to an attribute value of the third attribute; or when a data page of each of the j data blocks is not a first compressed page of the $i^{th}$ compressed data block, assign 0 to an attribute value of the third attribute.

In a specific and possible implementation, the attribute information includes the seventh attribute, and the updating unit 1503 is further configured to: when the attribute value of the third attribute is 1, update the attribute value of the seventh attribute to the offset of the data block in the set corresponding to the compressed data block; or when the attribute value of the third attribute is 0, update the attribute value of the seventh attribute to the distance between the data page of the data block and the first compressed page of the compressed data block.

In a specific and possible implementation, the attribute information includes the fourth attribute, and the updating unit 1503 is further configured to: when a data page of each of the j data blocks is included in compressed data pages of two compressed blocks, assign 1 to an attribute value of the fourth attribute; or when a data page of each of the j data blocks is not included in compressed data pages of two compressed blocks, assign 0 to an attribute value of the fourth attribute.

In a specific and possible implementation, the attribute information includes the second attribute, and the updating unit is further configured to: when a data page of each of the j data blocks is valid, assign 1 to an attribute value of the second attribute; or when a data page of each of the j data blocks is invalid, assign 0 to an attribute value of the second attribute.

In some possible implementations, the apparatus further includes: a second obtaining unit 1504, configured to obtain a second set of to-be-overwritten data, where the second set includes p compressed data blocks, and p is a positive integer greater than or equal to 1; a third obtaining unit 1505, configured to obtain a compressed page of a first target compressed data block in the p compressed data blocks and q data blocks corresponding to the compressed page of the first target compressed data block, where q is a positive integer greater than or equal to 1; a first determining unit 1506, configured to determine, in the q data blocks, a location offset of a first target data block in the q data blocks; and a second determining unit 1507, configured to determine that a data page of the first target data block is a data page of the to-be-overwritten data.

In some possible implementations, the apparatus further includes: a first reading unit, configured to read a first index of a first data block to obtain an index address of a first compressed data block corresponding to the first data block, where the first index includes attribute information of the first data block; a second reading unit, configured to read an index of the first compressed data block corresponding to the first data block; a decompression unit, configured to decompress the first compressed data block based on the index of the first compressed data block, to obtain a plurality of data blocks corresponding to the first compressed data block, where the plurality of data blocks include the first data block; a third determining unit, configured to determine an offset of the first data block in a plurality of decompressed data blocks; and a third obtaining unit, configured to obtain data of the first data block based on the offset of the first data block in the plurality of decompressed data blocks.

In a specific and possible implementation, the first index is used to identify a storage location of the $i^{th}$ compressed data block in the storage medium, and attribute information included in each of the j data blocks.

Therefore, according to the data compression method provided in embodiments of this application, when a data block is read, read efficiency can be effectively improved, and it can be ensured that data is read in a random read scenario with a small read amplification coefficient. In addition, an attribute included in the index of the data block may be modified, so that a compressed file on a storage device may be modified. It can be learned that, in embodiments of this application, a problem of random read amplification of a compression solution in an existing read/write file system is resolved, and a problem that an existing file system with a fixed output compression manner cannot support data and metadata update is resolved.

An embodiment of this application further provides a device. The device includes units configured to perform the steps according to any one of the foregoing implementations, or units configured to perform the steps according to any one of the foregoing implementations.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product is run on a computer, the computer is enabled to perform any one of the foregoing methods.

An embodiment of this application further provides a chip. The chip includes a processor and an interface circuit. The interface circuit is coupled to the processor. The processor is configured to run computer programs or instructions, to implement the foregoing methods. The interface circuit is used to communicate with another module outside the chip.

In descriptions of this application, unless otherwise specified. "/" means "or". For example, A/B may represent A or B. A term "and/or" in this specification describes only an association relationship between associated objects and indicates that there may be three relationships. For example. A and/or B may represent the following three cases: Only A exists, both A and B exist, and only B exists. In addition. "at least one" means one or more, and "a plurality of" means two or more. The words such as "first" and "second" do not limit a quantity or an execution sequence, and the words such as "first" and "second" do not indicate a definite difference.

In descriptions of this application, words such as "example" or "for example" are used to give an example, an illustration, or a description. Any embodiment or design scheme described as "an example of" or "for example" in embodiments of this application should not be explained as being more preferred or having more advantages than another embodiment or design scheme. To be precise, the words such as "example" or "for example" are intended to present a relative concept in a specific manner.

The foregoing description about the implementations allows a person skilled in the art to clearly understand that, for the purpose of convenient and brief description, division into only the foregoing function modules is used as an example for description. During actual application, the foregoing functions can be allocated to different function modules for implementation as required. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data compression method, wherein the method comprises:
    obtaining m data blocks in a data area of a readable and writable file system, wherein m is a positive integer greater than or equal to 1;
    compressing the m data blocks by using a preset compression algorithm, to sequentially obtain n compressed data blocks, wherein first capacities of the compressed data blocks are the same, the first capacity represents a quantity of bytes of compressed data that can be comprised in the compressed data block, and n is a positive integer greater than or equal to 1; and
    establishing a first index of each of j data blocks corresponding to an $i^{th}$ compressed data block in the n compressed data blocks, and recording a mapping relationship between first indexes and the j data blocks, wherein i is a positive integer greater than or equal to 1 and less than or equal to n, and j is a positive integer greater than or equal to 1 and less than or equal to m, wherein
    the first index identifies a storage location, in a storage medium, of each data block comprised in the j data blocks, and attribute information comprised in each of the j data blocks.

2. The method according to claim 1, wherein the compressing the m data blocks by using a preset compression algorithm, to sequentially obtain n compressed data blocks comprises:
    sequentially allocating data blocks in the m data blocks to a first set in a preset order; and
    when a data capacity of the j data blocks in the first set is equal to a rated capacity of the first set, performing a compression operation on the j data blocks based on a specified compression threshold, to obtain the $i^{th}$ compressed data block.

3. The method according to claim 2, wherein the establishing a first index of each of j data blocks corresponding to an $i^{th}$ compressed data block in the n compressed data blocks comprises:
    when a sum of a total data length of header data and compressed data of the $i^{th}$ compressed data block and the specified compression threshold is less than or equal to a total data length of the j data blocks, establishing the first index of each of the j data blocks.

4. The method according to claim 1, wherein the attribute information comprises at least one of the following:
    a first attribute, representing whether a storage location of a compressed data block into which a data block is compressed is pre-allocated;
    a second attribute, representing whether a data page of a data block is valid;
    a third attribute, representing whether a data page of a data block is a first compressed page of a compressed data block of the data block;
    a fourth attribute, representing whether a data page of a data block is comprised in compressed data pages of two compressed blocks;
    a fifth attribute, representing whether a data page of a data block is a compressed page of a compressed data block obtained by compressing the data block;
    a sixth attribute, representing an index address of a compressed data block in which a data page of a data block is located; or
    a seventh attribute, representing that when a data page of a data block belongs to a first compressed page of a compressed data block of the data block, an attribute value of the seventh attribute is an offset of the data block in a set corresponding to the compressed data block; and when the data page of the data block does not belong to the first compressed page of the compressed data block of the data block, the attribute value of the seventh attribute is a distance between the data page of the data block and the first compressed page of the compressed data block.

5. The method according to claim 4, wherein the attribute information comprises the third attribute, and the establishing a first index of each of j data blocks corresponding to an $i^{th}$ compressed data block in the n compressed data blocks comprises:
    when a data page of each of the j data blocks is a first compressed page of the $i^{th}$ compressed data block, assigning 1 to an attribute value of the third attribute; or
    when a data page of each of the j data blocks is not a first compressed page of the $i^{th}$ compressed data block, assigning 0 to an attribute value of the third attribute.

6. The method according to claim 4, wherein the attribute information comprises the seventh attribute, and the method further comprises:
- when the attribute value of the third attribute is 1, updating the attribute value of the seventh attribute to the offset of the data block in the set corresponding to the compressed data block; or
- when the attribute value of the third attribute is 0, updating the attribute value of the seventh attribute to the distance between the data page of the data block and the first compressed page of the compressed data block.

7. The method according to claim 4, wherein the attribute information comprises the fourth attribute, and the establishing a first index of each of j data blocks corresponding to an $i^{th}$ compressed data block in the n compressed data blocks comprises:
- when a data page of each of the j data blocks is comprised in compressed data pages of two compressed blocks, assigning 1 to an attribute value of the fourth attribute; or
- when a data page of each of the j data blocks is not comprised in compressed data pages of two compressed blocks, assigning 0 to an attribute value of the fourth attribute.

8. The method according to claim 4, wherein the attribute information comprises the second attribute, and the establishing a first index of each of j data blocks corresponding to an $i^{th}$ compressed data block in the n compressed data blocks comprises:
- when a data page of each of the j data blocks is valid, assigning 1 to an attribute value of the second attribute; or
- when a data page of each of the j data blocks is invalid, assigning 0 to an attribute value of the second attribute.

9. The method according to claim 1, wherein before the compressing the m data blocks by using a preset compression algorithm, to sequentially obtain n compressed data blocks, the method further comprises:
- obtaining a second set of to-be-overwritten data, wherein the second set comprises p compressed data blocks, and p is a positive integer greater than or equal to 1;
- obtaining a compressed page of a first target compressed data block in the p compressed data blocks and q data blocks corresponding to the compressed page of the first target compressed data block, wherein q is a positive integer greater than or equal to 1;
- determining, in the q data blocks, a location offset of a first target data block in the q data blocks; and
- determining that a data page of the first target data block is a data page of the to-be-overwritten data.

10. The method according to claim 1, wherein the first index identifies a storage location of the $i^{th}$ compressed data block in the storage medium and the attribute information comprised in each of the j data blocks.

11. A data compression apparatus, wherein the apparatus comprises:
- at least one processor; and
- one or more memories coupled to the at least one processor and storing programming instructions for execution by the at least one processor to cause the apparatus to:
  - obtain m data blocks in a data area of a readable and writable file system, wherein m is a positive integer greater than or equal to 1;
  - compress the m data blocks by using a preset compression algorithm, to sequentially obtain n compressed data blocks, wherein first capacities of the compressed data blocks are the same, the first capacity represents a quantity of bytes of compressed data that can be comprised in the compressed data block, and n is a positive integer greater than or equal to 1; and
  - establish a first index of each of j data blocks corresponding to an $i^{th}$ compressed data block in the n compressed data blocks, and record a mapping relationship between first indexes and the j data blocks, wherein i is a positive integer greater than or equal to 1 and less than or equal to n, and j is a positive integer greater than or equal to 1 and less than or equal to m, wherein
  - the first index identifies a storage location, in a storage medium, of each data block comprised in the j data blocks, and attribute information comprised in each of the j data blocks.

12. The apparatus according to claim 11, wherein the programming instructions, when executed by the at least one processor, cause the apparatus to:
- sequentially allocate data blocks in the m data blocks to a first set in a preset order; and
- when a data capacity of the j data blocks in the first set is equal to a rated capacity of the first set, perform a compression operation on the j data blocks based on a specified compression threshold, to obtain the $i^{th}$ compressed data block.

13. The apparatus according to claim 12, wherein the programming instructions, when executed by the at least one processor, cause the apparatus to:
- when a sum of a total data length of header data and compressed data of the $i^{th}$ compressed data block and the specified compression threshold is less than or equal to a total data length of the j data blocks, establish the first index of each of the j data blocks.

14. The apparatus according to claim 11, wherein the attribute information comprises at least one of the following:
- a first attribute, representing whether a storage location of a compressed data block into which a data block is compressed is pre-allocated;
- a second attribute, representing whether a data page of a data block is valid;
- a third attribute, representing whether a data page of a data block is a first compressed page of a compressed data block of the data block;
- a fourth attribute, representing whether a data page of a data block is comprised in compressed data pages of two compressed blocks;
- a fifth attribute, representing whether a data page of a data block is a compressed page of a compressed data block obtained by compressing the data block;
- a sixth attribute, representing an index address of a compressed data block in which a data page of a data block is located; and
- a seventh attribute, representing that when a data page of a data block belongs to a first compressed page of a compressed data block of the data block, an attribute value of the seventh attribute is an offset of the data block in a set corresponding to the compressed data block; and when the data page of the data block does not belong to the first compressed page of the compressed data block of the data block, the attribute value of the seventh attribute is a distance between the data page of the data block and the first compressed page of the compressed data block.

15. The apparatus according to claim 14, wherein the attribute information comprises the third attribute, and the programming instructions, when executed by the at least one processor, cause the apparatus to:

when a data page of each of the j data blocks is a first compressed page of the $i^{th}$ compressed data block, assign 1 to an attribute value of the third attribute; or when a data page of each of the j data blocks is not a first compressed page of the $i^{th}$ compressed data block, assign 0 to an attribute value of the third attribute.

16. The apparatus according to claim 14, wherein the attribute information comprises the seventh attribute, and the programming instructions, when executed by the at least one processor, cause the apparatus to:

when the attribute value of the third attribute is 1, update the attribute value of the seventh attribute to the offset of the data block in the set corresponding to the compressed data block; or when the attribute value of the third attribute is 0, update the attribute value of the seventh attribute to the distance between the data page of the data block and the first compressed page of the compressed data block.

17. The apparatus according to claim 14, wherein the attribute information comprises the fourth attribute, and the programming instructions, when executed by the at least one processor, cause the apparatus to:

when a data page of each of the j data blocks is comprised in compressed data pages of two compressed blocks, assign 1 to an attribute value of the fourth attribute; or when a data page of each of the j data blocks is not comprised in compressed data pages of two compressed blocks, assign 0 to an attribute value of the fourth attribute.

18. The apparatus according to claim 14, wherein the attribute information comprises the second attribute, and the programming instructions, when executed by the at least one processor, cause the apparatus to:

when a data page of each of the j data blocks is valid, assign 1 to an attribute value of the second attribute; or when a data page of each of the j data blocks is invalid, assign 0 to an attribute value of the second attribute.

19. The apparatus according to claim 11, wherein the programming instructions, when executed by the at least one processor, cause the apparatus to:

obtain a second set of to-be-overwritten data, wherein the second set comprises p compressed data blocks, and p is a positive integer greater than or equal to 1;

obtain a compressed page of a first target compressed data block in the p compressed data blocks and q data blocks corresponding to the compressed page of the first target compressed data block, wherein q is a positive integer greater than or equal to 1;

determine, in the q data blocks, a location offset of a first target data block in the q data blocks; and determine that a data page of the first target data block is a data page of the to-be-overwritten data.

20. The apparatus according to claim 11, wherein the first index identifies a storage location of the $i^{th}$ compressed data block in the storage medium and the attribute information comprised in each of the j data blocks.

* * * * *